(12) United States Patent
Chua et al.

(10) Patent No.: US 7,174,232 B2
(45) Date of Patent: Feb. 6, 2007

(54) JOB RELEASE WITH MULTIPLE CONSTRAINTS

(75) Inventors: Tay Jin Chua, Singapore (SG); Tian Xiang Cai, Singapore (SG); Ming Wei William Liu, Singapore (SG); Feng Yu Wang, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 276 days.

(21) Appl. No.: 10/979,069

(22) Filed: Nov. 1, 2004

(65) Prior Publication Data

US 2005/0096770 A1    May 5, 2005

Related U.S. Application Data

(60) Provisional application No. 60/515,417, filed on Oct. 30, 2003.

(51) Int. Cl.
*G06F 19/00* (2006.01)
(52) U.S. Cl. .................................... 700/102
(58) Field of Classification Search .............. 700/28, 700/99–102; 705/8; 718/102–104
See application file for complete search history.

(56) References Cited

U.S. PATENT DOCUMENTS

| 4,956,784 | A |   | 9/1990  | Hadavi et al. |
| 5,170,355 | A | * | 12/1992 | Hadavi et al. ............... 700/102 |
| 5,559,710 | A | * | 9/1996  | Shahraray et al. .......... 700/100 |
| 5,721,686 | A |   | 2/1998  | Shahraray et al. |
| 5,826,040 | A | * | 10/1998 | Fargher et al. ................. 705/8 |
| 6,014,760 | A | * | 1/2000  | Silva et al. .................... 714/46 |
| 6,038,539 | A | * | 3/2000  | Maruyama et al. ............. 705/8 |
| 6,131,093 | A | * | 10/2000 | Maruyama et al. ............ 707/8 |
| 6,584,369 | B2 | * | 6/2003 | Patel et al. .................. 700/100 |
| 6,606,530 | B1 | * | 8/2003 | Brouwers .................... 700/101 |
| 6,823,346 | B2 | * | 11/2004 | MacLellan et al. ...... 707/104.1 |
| 7,039,472 | B2 | * | 5/2006 | Sugimoto et al. ............. 700/14 |
| 7,076,781 | B2 | * | 7/2006 | Skovira ....................... 718/102 |

* cited by examiner

*Primary Examiner*—Maria N. Von Buhr
(74) *Attorney, Agent, or Firm*—Klarquist Sparkman, LLP

(57) ABSTRACT

To schedule the release of jobs from a pool of pending jobs, machine information and information about items to be processed are used to determine available machine capacity. Available machine capacity is allocated to jobs subject to multiple job release constraints. Allocation may be performed first for any pending jobs which were partially released during a previous time interval, and then to new jobs in decreasing order of determined job rank. If different operative constraints dictate different numbers of units of a job to be released, the minimum number of units meeting each constraint may be released. After the number of units to be released has been determined for a job, machine information is updated to account for available capacity consumed by the release of the selected number of units of the job. Updated information may be used for job release scheduling of the next job.

68 Claims, 18 Drawing Sheets

400

| WORK CENTER: CENTER 120 | | |
|---|---|---|
| PRODUCT | MC701 | MC702 |
| PRODUCT A | 1869 UPH | 0 UPH |
| PRODUCT B | 0 UPH | 2000 UPH |
| PRODUCT C | 1500 UPH | 2500 UPH |

500

| WORK CENTER: CENTER 110 | | | | | |
|---|---|---|---|---|---|
| PRODUCT | MC001 | MC002 | MC003 | MC004 | MC005 |
| PRODUCT A | DP | NP | DP | NP | NP |
| PRODUCT B | SP | NP | NP | MUST-NOT | SP |
| PRODUCT C | MUST | MUST-NOT | MUST | MUST-NOT | MUST-NOT |

800

| CATEGORY NUMBER | JOB RANKING CRITERION 1: DOOR-TO-DOOR OR ORDER-TO-LOADING REQUIREMENT SPECIFIED FOR JOB? | JOB RANKING CRITERION 2: JOB OVERDUE? | JOB RANKING CRITERION 3: JOB PRIORITY ≤4 ("FAST TRACK LOT")? | JOB RANKING CRITERION 4: COMMITED CUSTOMER FORECAST – SPECIFIED FOR JOB? |
|---|---|---|---|---|
| 1 | 1 | 1 | X | X |
| 2 | X | X | 1 | X |
| 3 | X | X | 0 | 1 |
| 4 | X | X | 0 | 0 |

| Category | LOT RANKING A | CUSTOMER PRIORITY B | LOT PRIORITY C | RECEIVE DATE D | Sort notes |
|---|---|---|---|---|---|
| 1ST CATEGORY — LOTS WITH EITHER DOOR-TO-DOOR OR ORDER-TO-LOADING REQUIREMENTS AND THAT ARE DUE | 1 | 1 | 1 | | THE 1ST CATEGORY IS FURTHER SORTED BY: -CUSTOMER PRIORITY & -LOT PRIORITY |
| | 2 | 1 | 2 | | |
| | 3 | 1 | 3 | | |
| | 4 | 2 | 1 | | |
| | 5 | 2 | 2 | | |
| | 6 | 3 | 1 | | |
| | 7 | 3 | 2 | | |
| | 8 | 3 | 3 | | |
| | 9 | 4 | 1 | | |
| | 10 | 5 | 1 | | |
| 2ND CATEGORY — FAST-TRACK LOTS EXCEPT THOSE ALREADY IN CATEGORY 1 | 11 | | 1 | | THE 2ND CATEGORY IS FURTHER SORTED BY: -LOW PRIORITY |
| | 12 | | 1 | | |
| | 13 | | 2 | | |
| | 14 | | 2 | | |
| | 15 | | 3 | | |
| | 16 | | 3 | | |
| | 17 | | 4 | | |
| | 18 | | 4 | | |
| 3RD CATEGORY — NON-FAST-TRACK LOTS WITH RUNRATE COMMITMENT | 19 | | 5 | | THE 3RD CATEGORY IS FURTHER SORTED BY: -LOT PRIORITY |
| | 20 | | 6 | | |
| | 21 | | 7 | | |
| | 22 | | 8 | | |
| | 23 | | 9 | | |
| | 24 | | 10 | | |
| 4TH CATEGORY — NON-FAST-TRACK LOTS WITHOUT RUNRATE COMMITMENT | 25 | | 5 | 8/3/03 | THE 4TH CATEGORY IS FURTHER SORTED BY: -LOT PRIORITY -RECEIVE DATE (FCFS) |
| | 26 | | 5 | 9/3/03 | |
| | 27 | | 6 | 8/3/03 | |
| | 28 | | 7 | 8/3/03 | |
| | 29 | | 8 | 8/3/03 | |
| | 30 | | 8 | 9/3/03 | |
| | 31 | | 9 | 7/3/03 | |
| | 32 | | 9 | 8/3/03 | |
| | 33 | | 9 | 8/3/03 | |
| | 34 | | 9 | 9/3/03 | |
| | 35 | | 10 | 7/3/03 | |
| | 36 | | 10 | 10/3/03 | |
| | 37 | | 10 | 11/3/03 | |
| | 38 | | 10 | 12/3/03 | |
| | 39 | | 10 | 13/3/03 | |
| | 40 | | 10 | 13/3/03 | |

FIG. 8B

|   | A<br>BASELINE CAPACITY GROUP SPECIFICATION ID | B<br>BASELINE CAPACITY (i.e. UPPER LIMIT OF UNITS TO BE RELEASED DURING 1 TIME INTERVAL) | C<br>MEMBER CHARACTERISTICS | | | | | |
|---|---|---|---|---|---|---|---|---|
|   |   |   | CUST. ID<br>C1 | PACKAGE<br>C2 | PAD SIZE<br>C3 | BODY SIZE<br>C4 | DEVICE<br>C5 | |
| I | 14SN(90X150)-13S | 150,000 |   | 16SOICN | 90X150 |   |   | IA |
|   |   |   |   | 14SOICNM | 93X140 |   |   | IB |
| II | 8SOICN-MIC(15H/P) | 400,000 | IRC | 8SOICN |   | 93X140 |   | IIA |
|   |   |   | IRH | 8SOICN |   | 93X140 |   | IIB |
|   |   |   | MIC | 8SOICN |   | 93X140 |   | IIC |
| III | 8SOICN-MIC(15H/P) | 12,000 | SEM |   |   |   | SMDA05C | |

FIG. 10

| A<br>JOB ID | B<br>QUANTITY | C<br>CUSTOMER ID | D<br>PACKAGE | E<br>PAD SIZE | F<br>BODY SIZE | G<br>DEVICE |
|---|---|---|---|---|---|---|
| LOT1 | 13,000 | SEM | 14SOICNM | 93X140 | 7.6x18.0<br>12.8x7.6 | SMDA05C |

FIG. 11

| | A | B | C | D | E | F | G |
|---|---|---|---|---|---|---|---|
| | PKG. L/C | CUST. | PADSIZE | DEVICE | BODYSIZE | TSSOP-AS (No. OF FIXTURES) | TSSOP-AS (UPH) |
| I | 24TSSOP | AAA | 118x130 | | | 3 | 520 |
| II | 20TSSOP | AAA | 100x100 | | | 4 | 500 |

1300

1500

| LEVEL | CUSTOMER ID | PKG. LEAD COUNT | PAD SIZE | BODY SIZE | DEVICE |
|---|---|---|---|---|---|
| 1 | V | V | V | V | V |
| 2 | V | V | V | | |
| 3 | | V | V | | |
| 4 | | V | | | |

FIRST LEVEL CONSOLIDATION 1600

| | CUSTOMER ID | PKG. LEAD COUNT | PAD SIZE | BODY SIZE | DEVICE | QUANTITY |
|---|---|---|---|---|---|---|
| | A | B | C | D | E | F |
| I | ANS | 14TSSOP | 118x122 | 10x10 | TSSOP14_254 | 20000 |
| II | ANS | 14TSSOP | 118x122 | 10x10 | TSSOP14_255 | 10000 |
| III | ELA | 14TSSOP | 118x122 | | TSSOP14_256 | 15000 |
| IV | DAL | 24TSSOP | 118x217 | 7x7 | TSSOP14_257 | 18000 |
| V | DAL | 24TSSOP | 118x217 | 7x7 | TSSOP14_258 | 30000 |
| VI | TIZ | 24TSSOP | 118x217 | | TSSOP14_259 | 25000 |
| VII | MTL | 24TSSOP | 138x138 | | TSSOP14_260 | 15000 |

FIG. 16A

SECOND LEVEL CONSOLIDATION 1602

| | CUSTOMER ID | PKG. LEAD COUNT | PAD SIZE | QUANTITY |
|---|---|---|---|---|
| I | ANS | 14TSSOP | 118x122 | 30000 |
| II | ELA | 14TSSOP | 118x122 | 15000 |
| III | DAL | 24TSSOP | 118x217 | 48000 |
| IV | TIZ | 24TSSOP | 118x217 | 25000 |
| V | MTL | 24TSSOP | 138x138 | 15000 |

FIG. 16B

THIRD LEVEL CONSOLIDATION 1604

| | PKG. LEAD COUNT | PAD SIZE | QUANTITY |
|---|---|---|---|
| I | 14TSSOP | 118x122 | 45000 |
| II | 24TSSOP | 118x217 | 73000 |
| III | 24TSSOP | 138x138 | 15000 |

FIG. 16C

FOURTH LEVEL CONSOLIDATION 1606

| | PKG. LEAD COUNT | QUANTITY |
|---|---|---|
| I | 14TSSOP | 45000 |
| II | 24TSSOP | 88000 |

FIG. 16D

| | A | B | C |
|---|---|---|---|
| | LOT NUMBER | FORECAST START DATE | FORECAST FG DATE |
| FULLY CONSUME DAY1 S X 1802 | 1 | DAY1 | DAY5 |
| | 2 | DAY1 | DAY5 |
| | 3 | DAY1 | DAY5 |
| | 4 | DAY1 | DAY5 |
| | 5 | DAY1 | DAY5 |
| | 6 | DAY1 | DAY5 |
| | 7 | DAY1 | DAY5 |
| | 8 | DAY1 | DAY5 |
| | 9 | DAY1 | DAY5 |
| | 10 | DAY1 | DAY5 |
| FULLY CONSUME DAY2 S X 1804 | 11 | DAY2 | DAY6 |
| | 12 | DAY2 | DAY6 |
| | 13 | DAY2 | DAY6 |
| | 14 | DAY2 | DAY6 |
| | 15 | DAY2 | DAY6 |
| | 16 | DAY2 | DAY6 |
| | 17 | DAY2 | DAY6 |
| | 18 | DAY2 | DAY6 |
| | 19 | DAY2 | DAY6 |
| | 20 | DAY2 | DAY6 |
| FULLY CONSUME DAY3 S X 1806 | 21 | DAY3 | DAY7 |
| | 22 | DAY3 | DAY7 |
| | 23 | DAY3 | DAY7 |
| | 24 | DAY3 | DAY7 |
| | 25 | DAY3 | DAY7 |
| | 26 | DAY3 | DAY7 |
| | 27 | DAY3 | DAY7 |
| | 28 | DAY3 | DAY7 |
| | 29 | DAY3 | DAY7 |
| | 30 | DAY3 | DAY7 |

| LOT NUMBER | FORECAST START DATE | FORECAST FG DATE |
|---|---|---|
| A | DAY2 | DAY6 |
| B | DAY2 | DAY6 |
| C | DAY2 | DAY6 |
| D | DAY2 | DAY6 |
| E | DAY2 | DAY6 |
| 11 | DAY2 | DAY6 |
| 12 | DAY2 | DAY6 |
| 13 | DAY2 | DAY6 |
| 14 | DAY2 | DAY6 |
| 15 | DAY2 | DAY6 |
| 16 | DAY2 | DAY6 |
| 17 | DAY2 | DAY6 |
| 18 | DAY2 | DAY6 |
| 19 | DAY2 | DAY6 |
| 20 | DAY2 | DAY6 |

FULLY CONSUME DAY2 S X 1812 (rows A–14)
CONSUME DAY2 S Y 1814 (rows 15–20)

| LOT NUMBER | FORECAST START DATE | FORECAST FG DATE |
|---|---|---|
| A | DAY2 | DAY6 |
| B | DAY2 | DAY6 |
| C | DAY2 | DAY6 |
| D | DAY2 | DAY6 |
| E | DAY2 | DAY6 |
| 11 | DAY2 | DAY6 |
| 12 | DAY2 | DAY6 |
| 13 | DAY2 | DAY6 |
| 14 | DAY2 | DAY6 |
| 15 | DAY2 | DAY6 |
| 16 | DAY2 | DAY6 |
| 17 | DAY2 | DAY6 |
| 18 | DAY2 | DAY6 |

FULLY CONSUME DAY2s X 1812 (rows A–14)
CONSUME DAY2s Y 1824 (rows 15–18)

| | A | B | C |
|---|---|---|---|
| | LOT NUMBER | FORECAST START DATE | FORECAST FG DATE |
| FULLY CONSUME DAY3s X 1832 | 19 | DAY3 | DAY7 |
| | 20 | DAY3 | DAY7 |
| | 21 | DAY3 | DAY7 |
| | 22 | DAY3 | DAY7 |
| | 23 | DAY3 | DAY7 |
| | 24 | DAY3 | DAY7 |
| | 25 | DAY3 | DAY7 |
| | 26 | DAY3 | DAY7 |
| CONSUME DAY3s Y 1834 | 27 | DAY3 | DAY7 |
| | 28 | DAY3 | DAY7 |
| | 29 | DAY3 | DAY7 |
| | 30 | DAY3 | DAY7 |

| | A | B | C |
|---|---|---|---|
| | LOT NUMBER | FORECAST START DATE | FORECAST FG DATE |
| FULLY CONSUME DAY3s X 1832 | 19 | DAY3 | DAY7 |
| | 20 | DAY3 | DAY7 |
| | 21 | DAY3 | DAY7 |
| | 22 | DAY3 | DAY7 |
| | 23 | DAY3 | DAY7 |
| | 24 | DAY3 | DAY7 |
| | 25 | DAY3 | DAY7 |
| FULLY CONSUME DAY4s Y 1844 | 26 | DAY3 | DAY7 |
| | 27 | DAY3 | DAY7 |
| | 28 | DAY3 | DAY7 |
| | 29 | DAY4 | DAY8 |
| | 30 | DAY4 | DAY8 |
| CONSUME DAY4s X 1846 | | DAY4 | DAY8 |

FIG. 18E

| PART/DAY | DIE INV. | BOOKED CAP | BTG | OPTIMUM CAP | SPOT ORDER PER BTG | SPOT ORDER PER DIE INV. |
|---|---|---|---|---|---|---|
| AMD_14SSOP | 250K | 400K | 400K | 600K | | |
| AMD_14SSOP(D1) | 250K | 400K | 400K | 600K(6D) | 200K | 350K |
| AMD_14SSOP(D2) | 200K | 400K | 300K | 500K(5D) | 200K | 300K |
| AMD_14SSOP(D3) | 100K | 400K | 250K | 400K(4D) | 150K | 300K |
| AMD_14SSOP(D4) | 100K | 400K | 150K | 300K(3D) | 150K | 200K |
| AMD_14SSOP(D5) | 100K | 400K | 50K | 200K(2D) | 150K | 100K |
| AMD_14SSOP(D6) | | | | | | |

| | A | B | C | D | E | F | G | H |
|---|---|---|---|---|---|---|---|---|
| | PART | DIE INV. | BOOKED CAP | BTG | OPTIMUM CAP | SPOT ORDER PER BTG | SPOT ORDER PER DIE INV. | ADHOC QTY |
| | AMD_14TSSOP | 250K | 400K | 400K | 600K | 100K | 250K | |

FIG. 21

| | A | B | C | D | E | F | G | H | I |
|---|---|---|---|---|---|---|---|---|---|
| | CUST | PACKAGE LC | DIE INV. | BOOKED CAP | BTG | OPTIMUM CAP | SPOT ORDER PER BTG | SPOT ORDER PER DIE INV. | ADHOC QTY |
| | AMD | 14TSSOP | 250K | 400K | 400K | 500K | 0K | 150K | 100K |

FIG. 22

JOB RELEASE WITH MULTIPLE CONSTRAINTS

CROSS REFERENCE TO RELATED APPLICATIONS

The present application claims the benefit of prior provisional application Ser. No. 60/515,417 filed Oct. 30, 2003, the contents of which are hereby incorporated by reference hereinto.

FIELD OF THE INVENTION

The present invention generally relates to the release of jobs, as in a production environment. More particularly, the invention relates to the release of jobs based on the application of multiple constraints.

BACKGROUND OF THE INVENTION

In a production environment, it is important to determine when jobs should be released for processing. A job is a number of items to be processed, or a number of tasks to be completed. Processing of an item may for example comprise building or assembling a product, or a part of a product, from raw materials or components. The terms "items", "products" and "parts" may be used interchangeably to refer to units to be processed. A job may be governed by a "work order" which describes the set of operations to be performed to process a specified number of units of a particular item (or group of items) or the set of operations to be performed to complete a particular task. In certain production environments (e.g. in the semiconductor field), jobs may be referred to as "lots".

Jobs have various attributes, such as a desired quantity of units, item characteristics, release date, due date, and the like, which may vary from job to job. Although many jobs be associated with a single type of item (e.g. a particular product), some jobs may be associated with two or more different types of items having similar characteristics. For example, in the semiconductor industry, items may be grouped into jobs based on product attributes, such as package type, lead count, pad size, device type and the associated motherlot, waferlot, and sublot identifiers.

Jobs are processed by machines. Machines may be grouped into work centers. A "work center" is a set of one or more machines having similar capabilities, each machine being capable of performing the same general processing operation. For example, in a semiconductor backend assembly environment, a "Wire Bond" work center may contain multiple wire bonders which come from different equipment manufacturers, yet they are all generally capable of completing the wire bonding operation. The terms "work center" and "operation" are sometimes used interchangeably.

Job release is an important and critical step in production planning. In the field of production planning, "job release" refers to the release of jobs from a pool of pending jobs for processing by machines on the shop floor. Job release scheduling dictates which jobs are to be released to the shop floor, at what time, and in what quantity of units (i.e. whether the job will be fully released or partially released). A job is said to be fully or 100% released to the shop floor when processing of all of the units comprising the job has been designated to commence during a particular time interval. A job is said to be partially released when processing of only some of the units comprising the job has been designated to commence during a particular time interval. For clarity, a distinction should be made between the release of a job (i.e. designation of at least a portion of the job for processing during a time interval) and the actual commencement of processing: a job may be fully or partially released even though no processing of the job has yet commenced. When a job is partially released, it may be deemed to be "X % released", where X is a percentage determined from the ratio of the number of units that have been released over the total number of desired units in the job.

Regardless of whether a job is fully released or partially released during a particular time interval, processing of the released quantity is expected to complete during that time interval. In the case of a partially released job, it is usually desirable to release the unreleased portion of the job for processing in an immediately following time interval or intervals. "Job dispatching" refers to the scheduling of released jobs already on the production floor. Released jobs could be yet to be processed, i.e. queued at the first work center; currently being processed at a work center; or currently queued at an intermediate work center. In conventional production planning, job release and job dispatching are planned separately. It is said that job release control plays a more significant role than job dispatching in effective shop floor scheduling. On one hand, it is inefficient to release too many jobs at a time because some jobs will not be completed in a scheduled period of time and materials have to be stored on site until job completion. On the other hand, if too few jobs or the wrong types of jobs are released, production capacity will not be utilized to its full potential.

Various job release strategies are known. Generally, the known strategies control the job release to maintain a certain production parameter at a constant level. For example, the CONWIP (constant WIP) strategy attempts to maintain a constant Work-in-Process (WIP) level in the production. As is known in the art, WIP generally refers to a product or products in various stages of completion throughout a processing facility, including raw material that has been released for initial processing through to completely processed products awaiting final inspection. The Bottleneck strategy attempts to maintain an appropriate work load at a bottleneck operation. A bottleneck operation is an operation having limited processing capacity which may restrict the number of units of an item that can be processed during a time interval. The Global input/output strategy attempts to maintain a zero differential between the number of jobs released and completed over a given time interval. The Fixed Quantity Release strategy attempts to achieve a desired production output target.

Each of these known strategies has certain drawbacks. While studies have shown that the CONWIP strategy performs significantly better than the Bottleneck strategy, and both perform better than the other known strategies in a wide variety of conditions, in wafer fabrication facilities, it has been observed that application of the CONWIP strategy or its variants, while possibly resulting in reduced variability of WIP and cycle time of the wafer fabrication facility, tend to increase WIP level and cycle time of the job pool. Further, determination of the appropriate WIP level is often a difficult task. If the WIP level is too high, the control over the production floor will decrease. If the WIP level is too low, resources or production capacity will not be sufficiently utilized.

Further, with known job release strategies, long setup time is often required between two consecutive planning periods. Setup time is the time required for a specific machine, resource, work center, or production line to convert from the production of the last good piece of an earlier released lot to the first good piece of a later released lot.

Thus, there is a need for an improved job release strategy.

SUMMARY OF THE INVENTION

To schedule the release of jobs from a pool of pending jobs, machine information and information about items to be processed are used to determine available machine capacity. Available machine capacity is allocated to jobs subject to multiple job release constraints. Allocation may be performed first for any pending jobs which were partially released during a previous time interval, and then to new jobs in decreasing order of determined job rank. If different operative constraints dictate different numbers of units of a job to be released, the minimum number of units meeting each constraint may be released. After the number of units to be released has been determined for a job, machine information is updated to account for available capacity consumed by the release of the selected number of units of the job. Updated information may be used for job release scheduling of the next job.

The job release constraints may include any of (1) a baseline capacity constraint; (2) a bottleneck capacity constraint; (3) a machine preference constraint; (4) a fixture/tooling capacity constraint (if the machine preference constraint is also operative); (5) WIP balancing constraint; (6) a committed forecast constraint; and (7) a loading pattern constraint.

In accordance with an aspect of the present invention there is provided a method of scheduling the release of jobs from a pool of pending jobs, the method comprising: selecting a job; determining available machine capacity for the job based on job characteristics of the job and machine information including machine availability information about one or more machines capable of processing the job; allocating at least some of the available machine capacity to the job subject to multiple job release constraints; and updating the machine availability information to reflect the allocating.

In accordance with another aspect of the present invention there is provided a machine-readable medium including code for scheduling the release of jobs from a pool of pending jobs, comprising: machine-executable code for selecting a job; machine-executable code for determining available machine capacity for the job based on job characteristics of the job and machine information including machine availability information about one or more machines capable of processing the job; machine-executable code for allocating at least some of the available machine capacity to the job subject to multiple job release constraints; and machine-executable code for updating the machine availability information to reflect the allocating.

In accordance with yet another aspect of the present invention there is provided a computing device comprising a processor and persistent storage memory in communication with the processor storing machine-readable code for directing the device to schedule the release of jobs from a pool of pending jobs, comprising: means for selecting a job; means for determining available machine capacity for the job based on job characteristics of the job and machine information including machine availability information about one or more machines capable of processing the job; means for allocating at least some of the available machine capacity to the job subject to multiple job release constraints; and means for updating the machine availability information to reflect the allocating.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In the figures which illustrate an exemplary embodiment of this invention:

FIGS. 8A and 8B illustrate the ranking of a set of new jobs using primary and secondary job ranking criteria respectively;

FIG. 10 illustrates an exemplary baseline capacity constraint definition which may be used to specify one or more baseline capacity job release constraints;

FIG. 11 illustrates the job characteristics of an exemplary job in respect of which the baseline capacity constraint definition of FIG. 10 may be applied;

FIG. 15 illustrates the specification of various degrees of required similarity between characteristics of jobs in adjacent time intervals for an operative loading pattern job release constraint;

FIGS. 16A, 16B, 16C and 16D illustrate the definition of patterns of job characteristics for purposes of identifying different degrees of similarity between jobs in adjacent time intervals;

FIGS. 18A to 18E illustrate forecast processing start dates and finished goods dates as determined by an alternative embodiment of the job release system;

FIG. 21 illustrates various available-to-promise quantities as determined by the alternative embodiment of FIG. 19 prior to specification of an ad hoc quantity for a prospective spot order; and FIG. 22 illustrates the available-to-promise quantities of FIG. 21 after specification of an ad hoc quantity for a prospective spot order.

DETAILED DESCRIPTION

Figure 1:
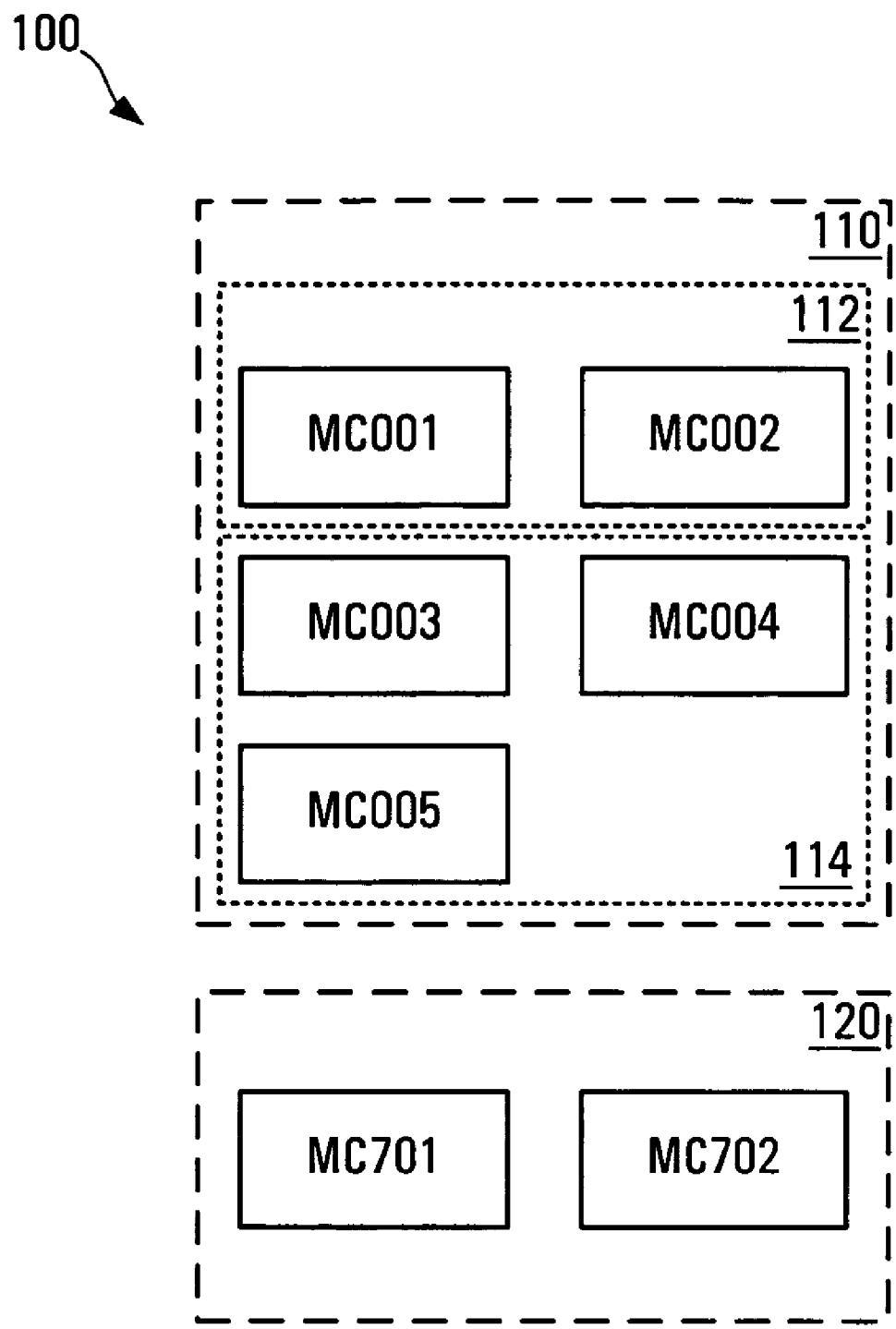
FIG. 1 illustrates a production facility having machines in respect of which job release is being determined.

Referring to FIG. 1, a production facility 100 having two work centers 110 and 120 is shown. Each work center 110 and 120 is a set of machines having similar capabilities at which a particular job processing operation can be performed. The operation that a work center is capable of completing is referred to herein using the same reference numeral as is used for the work center. Thus, work center 110 has five machines MC001, MC002, MC003, MC004 and MC005, each capable of performing operation 110, and work center 120 has two machines MC701 and MC702, each capable of performing operation 120.

The machines of work center 110 are further subdivided into two machine groups 112 and 114. A machine group is a grouping of machines within a work center which are of the same model and/or have the same manufacturer. Machines within a machine group generally have the same or similar characteristics (e.g. the same processing rate for a particular item).

Figure 2:
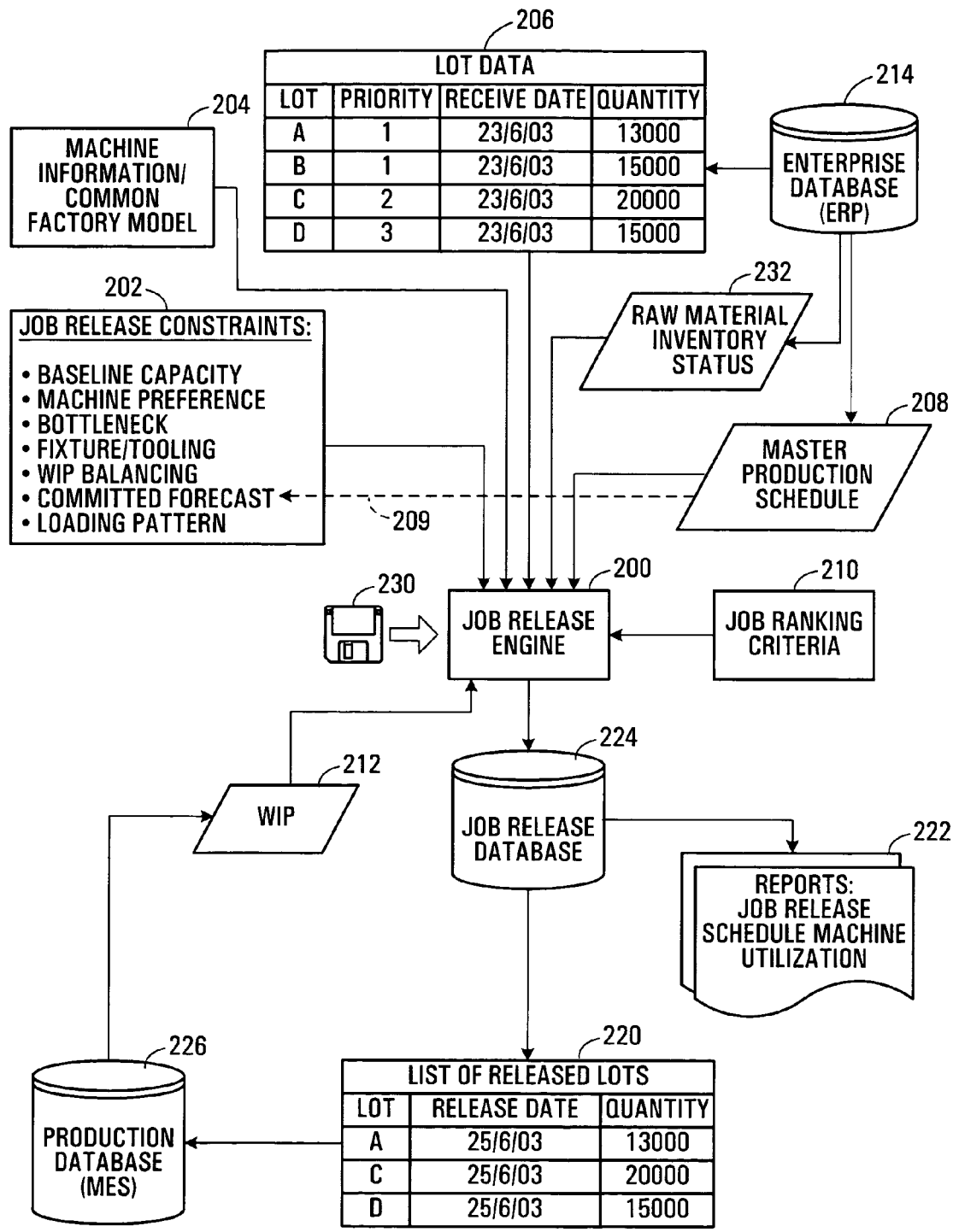
FIG. 2 illustrates an exemplary job release system and its various inputs and outputs.

FIG. 2 illustrates an exemplary job release system 200 (or job release "engine" 200) and its various inputs and outputs. The job release system 200 is responsible for scheduling the release of jobs from a pool of pending jobs to the shop floor (i.e. to production facility 100) based on multiple operative job release constraints selected by a user. Job release system 200 may comprise a computing device such as a PC having a processor, persistent storage memory storing an operating system such as Microsoft® Windows™ XP, a display, and an input device such as a keyboard and/or mouse (not shown), executing machine-executable code loaded into the system 200 from a machine-readable medium 230, which could be a magnetic or optical disk, a tape, a chip, or another form of primary or secondary storage for example. Because the exemplary system 200 is illustrated for a semiconductor production factory environment in which jobs are commonly referred to as lots, the job release system 200 may be referred to as a "lot release system (or engine) 200". If the term "lot" is used herein, it should be understood to more generally refer to a "job".

As shown in FIG. 2, inputs to the job release system 200 include a set of job release constraints 202, machine information 204, a pool of pending jobs 206, a master production schedule (MPS) 208, a set user-specified job ranking criteria 210 to be applied to new jobs, and a WIP status 212.

Job release constraints 202 are a set of one or more operative constraints which govern the job release scheduling performed the job release system 200. The operative constraints are selected by a user of the system 200, e.g., through interaction with a graphical user interface presented on a display of the system 200. As will be appreciated, each operative constraint should be satisfied to the maximum possible extent in order for a job to be released. In the present embodiment, seven selectively-engageable constraints are available. These include a baseline capacity constraint, a bottleneck capacity constraint, a machine preference constraint, a fixture/tooling capacity constraint, a WIP balancing constraint, a committed forecast constraint, and a loading pattern constraint. These constraints are each capable of being independently "toggled", with some exceptions that will become apparent. Each of these constraints is described in greater detail below.

Machine information 204 (which may alternatively be referred to as the "common factory model") includes various types of information about the production facility 100 (FIG. 1) in respect of which job release scheduling is to be performed. Machine information 204 includes information identifying the number and type of machines in production facility 100 and their grouping into work centers 110, 120. Machine information 204 also includes machine availability information and machine processing rate information.

Figures 3, 4, 5:
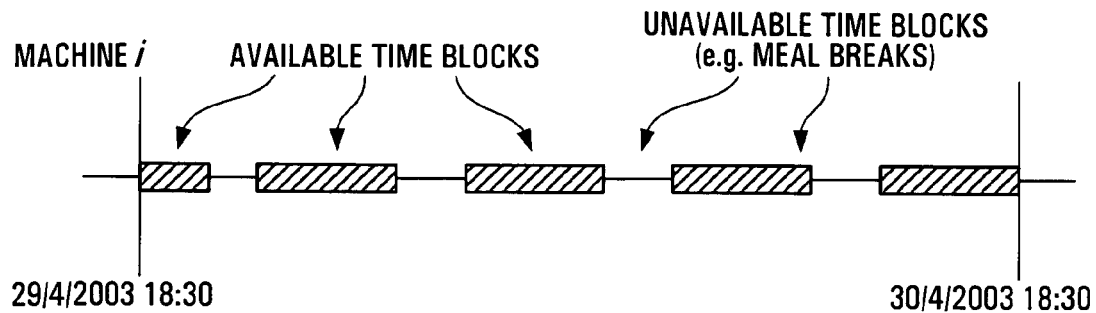
FIG. 3 illustrates a machine time line indicative of machine availability for an exemplary machine.
FIG. 4 illustrates an exemplary set of machine processing rate information for one of the work centers illustrated in FIG. 1.
FIG. 5 illustrates an exemplary set of machine preference levels for one of the work centers illustrated in FIG. 1.

Machine availability information indicates, for each machine shown in FIG. 1, the availability of the machine for processing jobs during a time interval of interest. Machine availability information may be represented in various ways. For example, one or more time lines may be maintained for each machine to reflect machine availability and allocation status. The time lines may identify time slots during which the machine is already booked for processing a job, time slots during which the machine is unavailable for other reasons (e.g. scheduled for preventative maintenance, meal break, or holiday shutdown), and time slots during which the machine is available. For each machine, timelines of various levels of granularity may be provided. For example, a first time line may indicate the availability of a machine on a week-to-week basis for a given production year, a second time line may indicate the availability of the machine on a day-to-day basis for a given week of interest (e.g. week 6 of the production year), and a third time line may indicate the hour-to-hour availability of the machine during a particular shift on a current day from week 6. Alternatively, a single timeline may exist for each machine. Timelines may be represented in software in various ways (e.g. as linked lists or matrices for example). An exemplary machine time line 300 is illustrated in FIG. 3.

Machine processing rate information indicates the rate at which each of the machines of FIG. 1 is capable of processing jobs in the pool of pending jobs 206. In the present embodiment, processing rates are expressed in terms of a rate (units per hour) at which the machines of FIG. 1 are capable of processing the items with which the jobs in pool 206 are associated. As will be appreciated, machine processing rate information is used in order to convert a machine's available time into a corresponding number of units of a particular item which can be processed during that available time, for purposes of determining how many units of a particular job can be released during the time interval of interest. An exemplary set of machine processing rate information 400 for the machines of work center 120 is illustrated in FIG. 4.

If the "machine preference constraint" job release constraint 202 (FIG. 2) is operative, machine information 204 may additionally include machine preference information indicating, for each machine in the production facility 100, the preference (or suitability) of that machine for processing each job in the pool of pending jobs 206. Because each work center 110, 120 includes multiple machines, and because different machines at a work center may have different capabilities while generally being capable of performing the operation with which the work center is associated, each machine may be more preferable or less preferable for processing an item associated with a particular job. In the present embodiment, machine preference information constitutes a set of a machine preference levels reflecting the preference of each machine for processing items associated with the jobs to be processed. For example, five different preference levels may exist: (1) Must—identifies machines that must be used for the current operation for reasons such as better throughput, tooling constraints, quality issues, and the like; (2) Dedicated Preferred (DP)— identifies machines that, although not mandatory, are preferred for completing the current operation; (3) Shared Preferred (SP)— identifies machines that are preferred for completing the current work order operation but not as preferable as DP machines; (4) No-Preference (NP)—identifies machines that can be used to complete the current work order operation but should only be used if no DP or SP machines are available; and (5) Must Not—identifies machines that must not be used for the current work order operation. In practice, these preference levels may be represented numerically, e.g. as an integer with a value of 0–4, with the magnitude of the integer corresponding to a level of preference for processing the relevant item with the current machine. Various other preference level implementation techniques would be apparent to those skilled in the art. Machine preference levels may sometimes be referred to as "machine loading preferences" or as "machine settings". An exemplary set of machine preference levels 500 for the machines of work center 110 is illustrated in FIG. 5.

Referring back to FIG. 2, the pool of pending jobs 206 represents the jobs in respect of which job release scheduling is to be performed. Jobs in the pool 206 generally fall into two groups. The first group consists of jobs for which partial release has been scheduled during the time interval preceding the time interval of interest. The second group consists of new jobs, i.e. jobs which have not yet been fully or partially released as of the time interval of interest. In any given run of the job release system 200, the jobs in pool 206 may fall into either one or both of these two groups.

In the present embodiment, the pool of pending jobs 206 is assumed to represent "lots in inventory". The term "lots in inventory" refers to lots which are available in a holding location for release on the shop floor, but have not yet been released onto the shop floor. In the case where the raw materials must be on hand in order for processing of the jobs to commence (e.g. if the processing in question constitutes creation of a product from raw materials), an optional raw material checking function allows a user of the job release system 200 to impose an additional check on the raw materials that are needed to support the production of the released lots. When this function is activated, the job release system will not release any job that has insufficient raw materials to support job processing. Typically, raw material inventory status 232 is retrieved from the Enterprise Database (ERP). When sufficient raw materials exist in inventory, jobs can be released to the shop floor, subject to the operative lot release constraints 202.

For each job within the pool of pending jobs 206, information about certain job characteristics is provided. For example, as shown in FIG. 2, job characteristics may include an alphanumeric job identifier (e.g. A, B, C, D), a job priority (e.g. 1, 2 or 3), and a receive date (i.e. a date on which the job order was received). Job characteristics will include a quantity, i.e. a desired number of items to be processed. Other job characteristics which may be provided may include an identifier of the item(s) associated with the job and physical characteristics of the item(s) associated with the job (not illustrated). Physically, jobs within the pool 206 may have various forms, depending upon the production facility environment. For example, for a semiconductor assembly and test environment, a lot in inventory may constitute wafers of dies that are awaiting processing to be converted into functional packages.

Master production schedule (MPS) 208 is an optional input defining a schedule for processing items for purposes of meeting a demand, e.g. as specified by a customer. MPS 208 may, for example, specify a number of semiconductor products that should be manufactured on a weekly basis for the next month to meet projected consumer demand. MPS 208 may alternatively be referred to as "committed customer forecast 208". Input MPS 208 is relevant to the committed forecast job release constraint (as indicated by dashed arrow 209). When the committed forecast job release constraint is operative, input MPS 208 will be converted to an upper limit of a number of units to be processed per time interval for particular items, as will be described. It is noted that some jobs in the pool of pending jobs 206 may not be identified in the MPS 208. For example, some jobs may be added to the pool of pending jobs 206 after an MPS 208 has been specified when a customer realizes with the passage of time that the MPS 208 does actually not meet the needs of emerging market conditions. Under such circumstances, any jobs that are not identified in MPS 208 will not be controlled by the committed forecast constraint.

Pending jobs 206 and the MPS 208 may be received from an enterprise resource planning (ERP) system database 214.

Job ranking criteria 210 are an optional input consisting of criteria by which new jobs (if any) within the pool of pending jobs 206 are ranked. Typical job ranking criteria may include job priority, customer priority, and a degree to which a job is overdue (which may be determined based on a desired shipment date and an expected processing duration, for example). Job priority may be an integer value representing the priority of a job (e.g. a rush job may be assigned a lower priority value indicating a higher lot priority than a non-rush job). Customer priority may for example be an integer value representing the priority of a customer with which a job is associated, which is usually the customer who has submitted the order. The degree to which a job is overdue may be expressed in terms of a critical ratio factor computed by the job release system 200 which measures the degree of "lateness" of a job based on when the job is received and a desired shipment date or loading date for the job. A "loading date" is a date on which it is desired for processing of the job to be initiated ("loaded" onto machines).

WIP status 212 represents a measure of the current WIP in the production facility 100. The WIP may represent a current measure of the cumulative WIP across all work centers 110, 120 of the production facility 100, or it may represent a current measure of the WIP at individual work centers or machines. It will be appreciated that the WIP status 212 may change from time interval to time interval as jobs are released, processed by different work centers, and completed. In the present embodiment, the WIP status 212 is determined by examination of a production database 226 associated with the production facility 100.

An optional input to the job release system 200 is a user-specified time interval of interest in respect of which job release scheduling is to be performed (not illustrated in FIG. 2). If the time interval of interest is not user-specified, it may be determined by way of a system time maintained by the job release system 200 and a predefined time interval.

Outputs of the job release system 200 shown in FIG. 2 include a list or schedule of jobs to be released 220 during a time interval of interest and reports 222.

The list of jobs to be released 220 indicates which jobs from the pool of pending jobs 206 should be released during the current time interval based on job release scheduling performed by the system 200. The list may for example be used to update the production database 226 with new lot release information, for such purposes as guiding a production facility supervisor as to which jobs should be processed during the next time interval.

Reports 222 include various types of reports which may be generated by the lot release system 200. For example, one type of report may simply indicate the lot release schedule determined by the system 200. Another type of report may provide an indication of machine utilization resulting from the lot release determined by the system 200.

In overview, a user of the job release system 200 of the present embodiment who wishes to schedule the release of jobs from the pool of pending jobs 206 for a specific time interval selects two or more job release constraints that shall be operative during operation of the system 200. The job release constraints may include any two or more of (1) a baseline capacity constraint; (2) a bottleneck capacity constraint; (3) a machine preference constraint; (4) a fixture/tooling capacity constraint (if the machine preference constraint is also chosen); (5) WIP balancing constraint; (6) a committed forecast constraint; and (7) a loading pattern constraint.

Upon initiation of a job release scheduling run, machine information 204 and information about the items to be processed is obtained. Machine information includes information regarding the availability of the machines to be used to process the items (e.g. which machines have available time slots and when) and machine processing rate information for each of the item(s) to be processed (e.g. machine X is capable of processing Y units per hour of item I). Depending upon which job release constraints are operative, machine information 204 may also include machine preference level information indicating, for each machine, the preference or suitability of that machine for processing each item. Using this information, available capacity at the machines is determined. Available machine capacity may for example be expressed as the number of units of each of the item(s) that can be processed by the machines during the time interval of interest.

If any of the jobs in the pool of pending jobs were partially released during a previous time interval, job release scheduling is performed for such jobs before it is performed for new jobs. The rationale for this approach is to attempt to complete jobs for which partial release has been planned in a previous time interval, in order to minimize machine setup/reconfiguration time between jobs and/or time intervals.

If any of the jobs in the pool of pending jobs are new jobs, the new jobs are ranked using a set of job ranking criteria. Release of new jobs is scheduled in decreasing order of determined job rank. The purpose of the ranking is to identify important or urgent jobs for which release should be scheduled first.

Job release scheduling is performed one job at a time, with all (previously) partially released jobs (if any) being scheduled first, followed by any new jobs. Partially released jobs are scheduled for release at the same machines to which they were released in the previous time interval, in order open to minimize conversion/setup time. Accordingly, no ranking is performed for partially released jobs. When job release scheduling is performed for a given job, each of the operative job release constraints is applied in order to determine the percentage of the job (e.g. the actual number of units of the item) that should be released during the current time interval. If different ones of the operative job release constraints dictate different percentages of the job which should be released, the minimum percentage meeting each of the constraints prevails. Once the percentage of the job to be released has been determined for the current job, machine information is updated appropriately to reflect the amount of available capacity that will be consumed by the release of the prevailing percentage/number of units of the job to be released. This updated machine information will be used by the system 200 when job release scheduling is performed for the next job, so that any recently made capacity allocations will be taken into consideration during job release scheduling for the next job.

The process is repeated either until the available machine capacity has been exhausted or until release has been scheduled for every job in the pool of pending jobs 206. At this stage the job release scheduling result is generated. The scheduling result may for example take the form of a list of jobs which is to be used by production control personnel to dictate which jobs are to be released, and in what quantities, to the production facility 100 during the next time interval (e.g. during the next shift).

Figure 6:
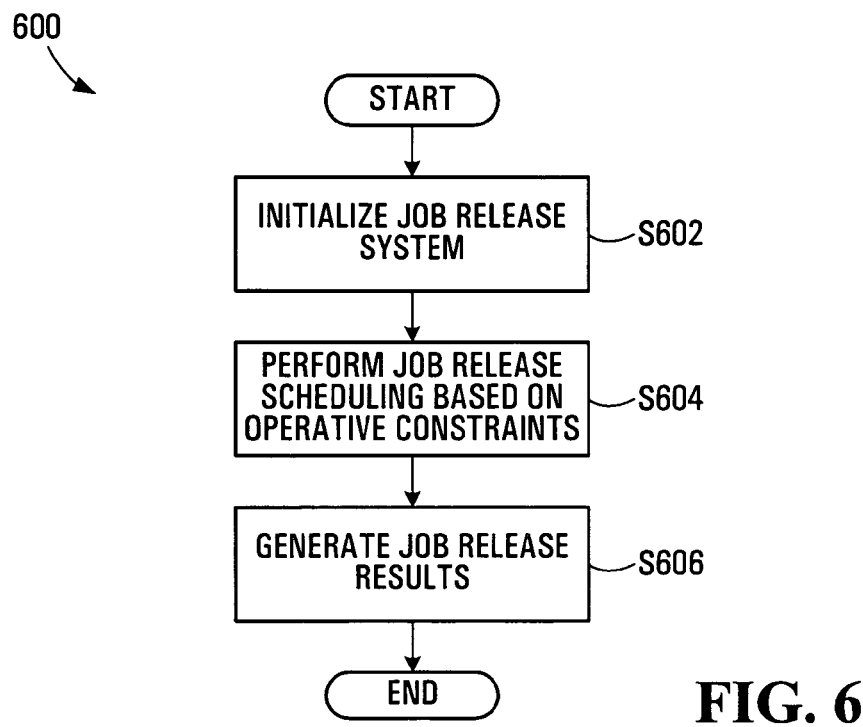
FIG. 6 illustrates high-level operation for performing job release scheduling for a pool of pending jobs.
Figure 7:
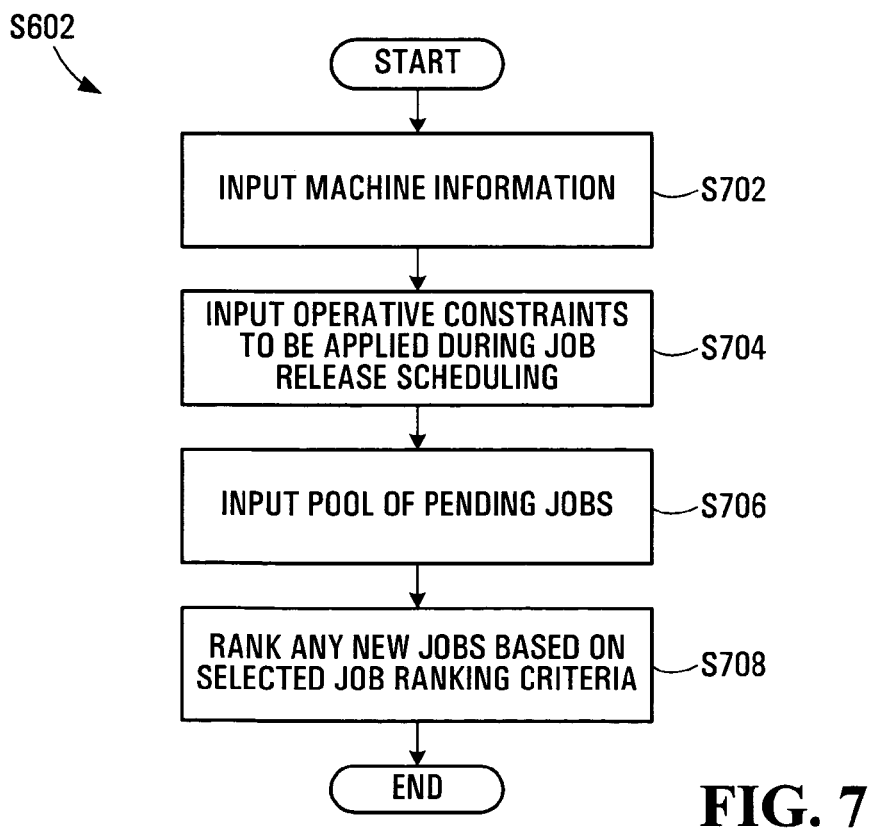
FIG. 7 illustrates the initialization operation of FIG. 6 in greater detail.
Figure 9:
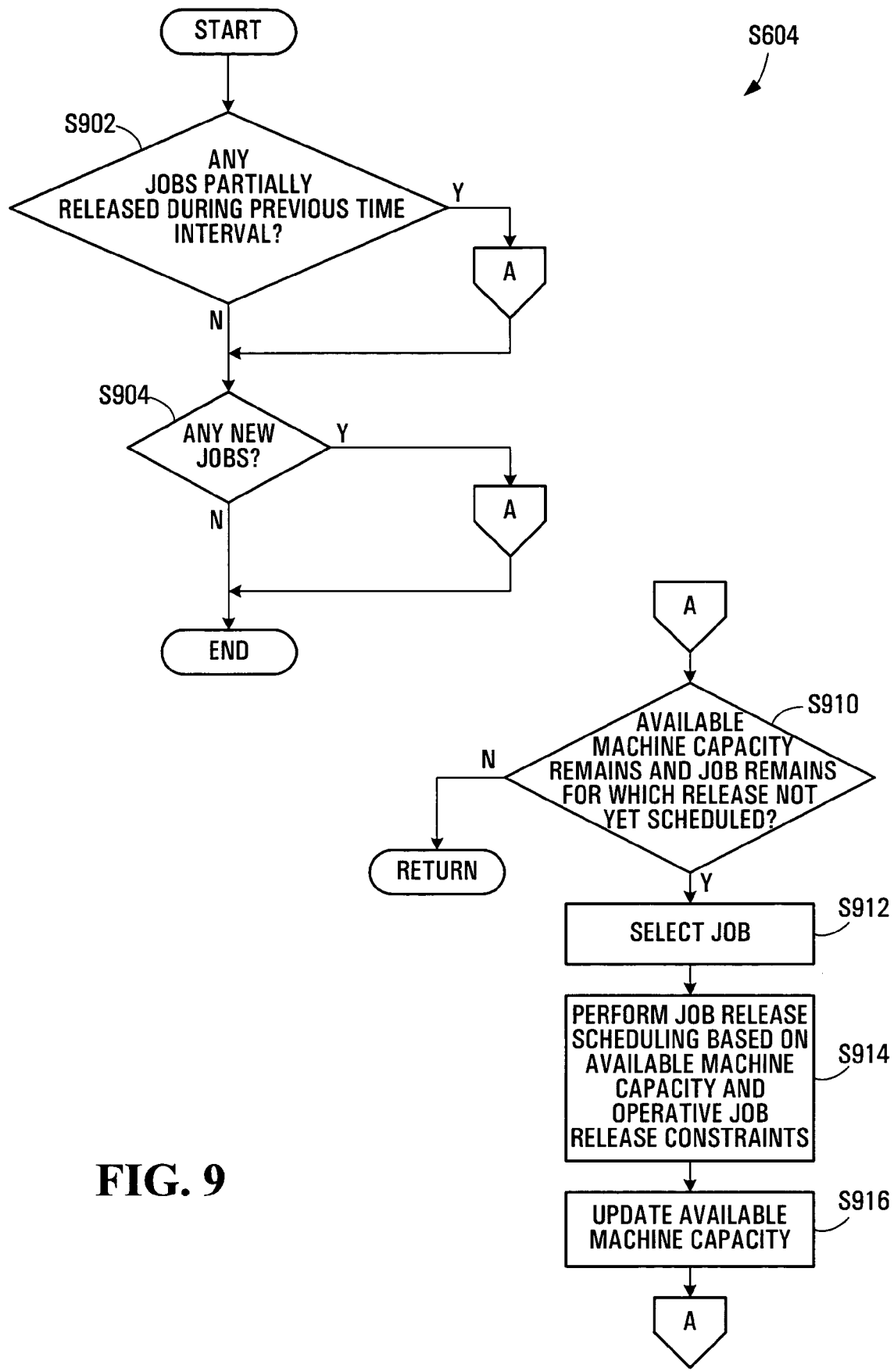
FIG. 9 illustrates job release scheduling in greater detail.

Operation of the lot release system 200 is illustrated in FIGS. 6, 7 and 9, and will be described with additional reference to FIGS. 1, 2, 8A, 8B, 10–15, 16A–16D, and 17.

Referring first to FIG. 6, high-level operation 600 for performing job release scheduling for a pool of pending jobs is illustrated. Initially, the job release system 200 (FIG. 2) is initialized (S602). Initialization entails inputting machine information 204, inputting the operative job release constraints 202 for the current job release scheduling run, obtaining information about the pool of pending jobs 206, and ranking any new jobs in order to determine which of the new jobs (if any) should be released first during the current time interval. Initialization operation S602 is illustrated in greater detail in FIG. 7, described below.

Following initialization, the system 200 performs job release scheduling for a selected time interval based on the currently operative constraints 202 (S604, FIG. 6). Job release scheduling operation S604 is illustrated in greater detail in FIG. 8, described below.

Upon completion of job release operation S604, the system 200 generates job release results (S606, FIG. 6). Job release results may take various forms. For example, job release results may simply be updated machine allocation data and machine availability for the production facility 100 reflecting the jobs released during the time interval of interest. Alternatively, job release results may constitute or include an up-to-date lot release schedule. In a further alternative, job release results may constitute or include one or more reports 222 (FIG. 2) illustrating the status of the production facility 100 following job release, e.g. showing machine utilization at each of the work centers 110 and 120 of the production facility 100. Operation 600 thus concludes.

Turning to FIG. 7, initialization operation S602 is illustrated in greater detail. Initially, machine information 204 (FIG. 2) is loaded into the job release system 200 (S702). In the illustrated exemplary embodiment, machine information 204 includes work center and routing information for the production facility 100 (e.g. which work centers including which machines are necessary to process various items, in which order), machine availability information for each machine in the production facility 100 (e.g. as shown in FIG. 3), machine processing rate information for each machine in the production facility 100 for various items (e.g. as shown in FIG. 4), and, if the machine preference job release constraint has been activated, machine preference level information representing the preference of each of the machines at production facility 100 for various items (e.g. as shown in FIG. 5).

After machine information 204 has been input by the system 200, the operative job release constraints to be applied during job release scheduling are input (S704, FIG. 7). The operative job release constraints may be selected by a user of the job release system 200 (e.g. via a GUI associated with the system 200). Any two or more of the following seven constraints may be selectively activated (with some limitations as will be discussed): (1) baseline capacity constraint; (2) bottleneck capacity constraint; (3) machine preference constraint; (4) fixture/tooling capacity constraint; (5) WIP balancing constraint; (6) committed forecast constraint; and (7) loading pattern constraint. Each of these constraints is described in detail below.

Thereafter, the system 200 inputs information about the pool of pending jobs 206 (S706), including job characteristics for each pending job. If the items to be processed are semiconductor industry products for example, job characteristics may include such physical characteristics as package type, pad size, body size and device identifier.

Subsequently, any new jobs are ranked based on user-specified set of job ranking criteria 210 (S708). More than one job ranking criterion may be active at a given time.

The manner in which multiple job ranking criteria may be applied to new jobs is illustrated in FIGS. 8A and 8B. FIGS. 8A and 8B illustrate the ranking of a set of forty new jobs. In the present embodiment, ranking is performed in using two sets of criteria: a primary set of ranking criteria and a secondary set of ranking criteria. The primary job ranking criteria are applied first in order to divide the newly received jobs into groups referred to as categories; this is shown in FIG. 8A. The secondary job ranking criteria are applied to each category of FIG. 8A in order to rank jobs within each category; this is shown in FIG. 8B.

Referring first to FIG. 8A, table 800 illustrates the application of four primary ranking criteria to new jobs to create five categories of jobs. The four primary ranking criteria that are applied in the present example are set forth in columns B to E of table 800. The first primary ranking criterion (column B) is whether or not the job in question has an associated door-to-door or order-to-loading requirement. A door-to-door requirement is a desired duration of time between the date/time on which a job is received and the date/time on which the job is shipped. An order-to-loading requirement is a desired duration between the date/time on which a job is created (the "order creation date") and the date/time on which job is released to the production facility, i.e., loaded onto machines (the "loading date"). The second primary ranking criterion (column C) is whether or not a job is overdue (based on critical ratio or committed shipment date). The third primary ranking criterion (column D) is whether or not the job priority is less than or equal to four, which is indicative of a so-called "fast track" (i.e. high priority) job in the illustrated embodiment. The fourth primary ranking criterion (column E) is whether or not a committed customer forecast (sometimes referred to as a "runrate commitment") is specified for the job. That is, the fourth criterion is whether or not a job is included in a master production schedule 208.

In table 800, each row represents a category resulting from application of the four primary criteria described above as shown in the cells of the row. As illustrated, each cell contains a value "1", "0" or "X". If the value in a cell is "1", this means that a job must have the criterion represented by the column in order to be included in the category represented by the row. If the value is "0", this means that a job must not have the criterion represented by the column in order to be included in the category represented by the row.

If the value is "X" ("do not care"), the value of the criterion represented by the column does not impact upon inclusion of a job into the category represented by the row. In the present embodiment, the "1", "0" and "X" values are specified by a user of the job release system 200. Of course, job ranking criteria may be specified in ways other than the illustrated "1", "0" and "X" approach, as will be recognized by those skilled in the art.

Accordingly, as shown in FIG. 8A, the "1", "0" and "X" values specified by the user in the present example result in four categories (numbered 1 to 4), each of which appears in a separate row of table 800 (the category number being specified in the first column A of table 800). Lower category number values are understood to indicate higher category rankings. In general, jobs within highly-ranked categories will be released before jobs within less highly-ranked categories (e.g. the jobs in category 1 will all be released before any job of category 2 is released). It is implicit in table 800 that if the characteristics of a job are such that the job qualifies in more than one category, the job will only be included in the most highly-ranked qualifying category.

The four categories of table 800 may be accordingly interpreted as follows. Jobs having an associated door-to-door or order-to-loading requirement that are overdue are ranked most highly (category 1), with job priority or the existence of a specified committed customer forecast for the job being immaterial to inclusion in category 1. In the next group (category 2) are all remaining "fast-track" jobs (except those already in category 1). In the present example, a "fast-track" job is a job with a job priority of 1–4 out of a possible 10 (i.e. a high priority job). Ranked next (in category 3) are non-fast-track jobs with a specified committed customer forecast. Finally, ranked last (category 4) are non-fast-track jobs without a specified committed customer forecast.

For jobs with a door-to-door requirement, a quantity referred to as a "critical ratio" may be computed in order to determine whether or not a job will be overdue (i.e. whether or not the job will meet a desired shipping date), using equation [1.1]:

$$CR=(SD-RD+PLT)/CT \qquad [1.1]$$

Where:
CR=Critical Ratio, which here is an indication of whether a job will be completed by a desired shipping date (CR>1 means that the job will be overdue)
SD=current System Date, i.e., the date on which the job release system is being executed
RD=Receive Date, i.e., the date on which a job is received (e.g. the date on which a work order is received at a production facility)
PLT=Product Lead Time, i.e., the amount of time required to process a product (or, more generically, item) from initiation to completion. In a semiconductor assembly environment, product lead time is the summation of the lead times incurred in the pre-assembly, assembly and test operations.
CT=desired "door-to-door" lead time for the job The "SD–RD" component of equation [1] represents the amount of time which has elapsed between the receipt of an incoming job order and time at which the job release system is executed. This component will have a positive value simply because an order cannot be released before it is received.

For jobs with an order-to-loading requirement, an equation for computing critical ratio is shown at [1.2]:

$$CR = (SD - OCD)/CT \quad [1.2]$$

Where:
CR=Critical Ratio, which here is an indication of whether a job will be loaded onto machine by a date (CR>1 means that the job will be overdue)
SD=current System Date, i.e., the date on which the job release system is being executed
OCD=Order Creation Date
CT=desired "order-to-loading" lead time for the job Turning to FIG. 8B, table 810 illustrates application of three secondary ranking criteria to the five categories of jobs described above to create a unique ranking for each of the forty new jobs of the present example. In table 810, the first column (column A) represents the resultant job ranking, which represents the order in which the job release system 200 will attempt to release the new jobs. The remaining three columns (columns B, C and D) represent the secondary ranking criteria to be applied in this example. Specifically, the first secondary ranking criterion (column B) is customer priority; the second criterion (column C) is job priority; and the third criterion (column D) is receive date. It is noted that the secondary criteria to be applied when ranking jobs within a particular category can differ from category to category. For example, in FIG. 8B the secondary job ranking criteria applied to category 1 (i.e. customer priority and job priority) differ from the secondary job ranking criteria applied to categories 2–4 (job priority only). When multiple secondary job ranking criteria are specified (e.g. as for categories 1 and 4), an order of application of the criteria may be specified. For example, during ranking of jobs in category 4, ranking is performed first based on job priority, with the receive date being used as a "tie breaker" to rank jobs of equal job priority, on a first-come first-served (FCFS) basis.

In FIG. 8B, when a particular secondary ranking criterion is not operative for a particular category, the cells in the column representative of that criterion will be empty. For example, in category 1, receive date (column D) is immaterial to the ranking, therefore the cells of column D are empty. In contrast, in each of categories 2 and 3, which are ranked solely by job priority, the cells of each column except column C are empty. Rows numbered 1 to 40 (in column A) represent jobs after secondary ranking has been performed. The values within operative secondary ranking criterion columns represent the values associated with the ranked jobs which result in the illustrated ranking.

When the ranking jobs of S708 (FIG. 7) is completed, initialization S602 is complete. At this stage, job release scheduling based on the operative job released constraints is performed (S604). Operation S604 is illustrated in greater detail in FIG. 9.

Initially, an assessment is made as to whether or not any of the jobs in the pool of pending jobs 206 were partially released during a previous time interval (S902). If this assessment is made in the affirmative, another assessment is made, namely, whether it is true that available machine capacity remains and a job remains for which job release scheduling has not yet been performed (S910). The purpose of the determination of S910 is to cause job release scheduling to be terminated if the available machine capacity at the production facility 100 (FIG. 1) has been exhausted or if job release scheduling has been completed for every job in the pool 206.

Assuming that the assessment of S910 is made in the affirmative, a job is selected (S912). Thereafter, job release scheduling is performed for the selected job based on the current available machine capacity and upon the operative job release constraints (S914). If different ones of the operative job release constraints dictate different percentages (i.e. numbers of units) of the job that should be released, the minimum percentage meeting each of the constraints will prevail. It is noted that a single job may be scheduled for released at multiple machines of a given work center during the same time interval. Thereafter, machine information 204 (e.g. machine timelines) is updated appropriately to reflect the amount of available machine capacity that will be consumed by the release of the current job (S916). Operation repeats at S910 until either the available machine capacity has been exhausted or until release has been scheduled for every partially released job.

Subsequently, an assessment is made as to whether or not any of the jobs in the pool of pending jobs 206 are new jobs (S904). If this assessment is made in the affirmative, operation proceeds at S910 as described above, until either the available machine capacity has been exhausted or until release has been scheduled for every new job. Of course, when a new job is selected in S912, it is selected according to the ranking of new jobs performed in SS708 (FIG. 7), in decreasing order of job rank, as previously described.

The job release scheduling performed in S914 is dependent upon which of the following seven exemplary job release constraints 202 (FIG. 2) are operative.

(1) Baseline Capacity Constraint

The baseline capacity constraint specifies a maximum number of units of any job whose characteristics match certain specified job characteristics that can be released during a single time interval. A baseline capacity constraint definition is a specification of one or more baseline capacity constraints. The job characteristics which must be present in order for a baseline capacity constraint to apply to a job are referred to as "member" characteristics. The rationale for specifying a baseline capacity constraint is to limit the release of jobs specifying a large quantity of units so that they will not monopolize a set of common resources (e.g. machines capable of processing many types of jobs) during a time interval. Thus, by specifying baseline capacities for several jobs, it is more likely that common production resources will be shared between various jobs during a particular time interval.

An exemplary baseline capacity constraint definition 1000 is illustrated in FIG. 10. The baseline capacity constraint definition 1000 is illustrated in the form of a table having three major rows I, II and III and three major columns A, B and C. Each major row represents a baseline capacity group specification, i.e., a specification of a baseline capacity constraint which is applicable to jobs matching the "member characteristics" of the group specification. Referring to the columns, a group specification identifier is provided in first major column A; a baseline capacity (i.e. the maximum number of units of matching jobs that should be released during a single time interval) is specified in major column B; and the "member characteristics" which must be present in a job in order for the job to match the baseline capacity group specification (and thus for the baseline capacity of column B to be applicable) are specified in major column C. Five member characteristics are specified in the illustrated example, each indicated in one of five minor columns into which major column C is subdivided. Specifically, the characteristics, which are particular to semiconductor products, are customer identifier, package type (e.g. package lead count), pad size, body size and device identifier; these are specified in minor columns C1, C2, C3, C4 and C5 respectively.

Referring to major row I containing baseline capacity group specification 14SN(90X150)-13S, in may be seen that the row I is subdivided into two minor rows Ia and Ib under major column C. Each minor row provides a distinct set of member characteristics, either one of which must be present in a job in order for the job to match the specification 14SN(90X150)-13S. Blank cells in the rows indicate that any value of the corresponding characteristic will be considered to match. Thus for example, minor row Ia specifies that, for any jobs having a package type of 16SOICN (minor column C2) and a pad size of 90×150 (minor column C3), a maximum of 150,000 units of the matching item (major column B, row I) can be released during the current time interval, regardless of the customer ID, body size and device to be processed. Similarly, minor row Ib specifies that the same baseline capacity of 150,000 units applies to any jobs having a package type of 14SOICNM and a pad size of 93×140. In a different example, major row III specifies that, for any jobs specifying a device type SMDA05C (minor column C5) and a customer identifier SEM (minor column C1), a maximum of 12,000 units can be released during a single time interval, regardless of the package type, pad size or body size of the device.

It is possible for a job to match more than one baseline capacity constraint. If this is the case, the lowest value of the matching baseline capacities shall be operative. For example, FIG. 11 illustrates the job characteristics of an exemplary job "Lot1" from the pool of pending jobs 206, in the form of a table 1100. Column A of table 1100 indicates the job identifier ("Job1"); column B indicates the desired quantity of items ("13,000"); column C provides a customer identifier ("SEM"), and columns D–G set forth various physical characteristics of the item to be processed (a semiconductor product). Referring back to FIG. 10, it will be appreciated that the job "Lot1" of FIG. 11 matches both of the 14SN(90X150)-13S group specification (major row I, FIG. 10) specifying a baseline capacity of 150,000 and the 8SOICN-MIC(15H/P) specification (major row III, FIG. 10) specifying a baseline capacity of 12,000. In this case, the lower value of the two specified baseline capacities, i.e. 12,000, will be the operative limit. This limit of 12,000 indicates that, if the baseline capacity constraint is operative, the job "Lot1", which has a quantity of 13,000 (see FIG. 11, column B), cannot be fully released during a single time interval; 1,000 units will be left over for release during a subsequent time interval.

Of course, it will be recognized that the illustrated capacity constraint definition 1000 (FIG. 10) is particular to the semiconductor industry. In other industries, the member characteristics specified under column C may be different in type and in number than those specified in minor columns C1–C5 of the present example.

(2) Bottleneck Capacity Constraint

The bottleneck capacity constraint limits the number of items of a job that can be released during a time interval at each work center associated with a processing operation of the job to a smallest one of a maximum quantity of items capable of being processed during the time interval at any of the work centers associated with a processing operation of that job. As suggested by the name "bottleneck", the bottleneck constraint essentially restricts the released number of items of a particular job to the minimum or "weakest link" number of units of the relevant item that can be processed at any work center associated with a processing operation of the job. This minimum number of units may be a result of limitations (e.g. a limited processing rate of a machine for processing the current item or limited machine availability due to scheduled down time or previous allocation to higher job priority items) at a work center. It should be appreciated that the bottleneck capacity constraint is not an absolute limit (e.g. "10,000 units max/time interval") specified by a user, but rather is a possibly fluctuating, job-specific limit that is computed automatically by the job release system 200 based on current machine information (e.g. machine availability information and processing rate information).

The maximum capacity for a particular work center associated with a processing operation of a specific job (expressed as a maximum number of items capable of being processed) may be computed according to equation [2]:

$$Qty = \sum_{i=1,n}^{n} \sum_{j=1,m}^{m} (1 - \alpha_i) * UPH_{ij} * \beta_i * AT_i \qquad [2]$$

Where:
Qty=Number of items the work center is capable of processing
n=Number of machines in the work center
m=Number of items allocated to machine i during the time interval
$\alpha_i$=Fractional usage factor of machine i during the time interval
$UPH_{ij}$=Processing rate expressed in units per hour for machine i processing item j
$\beta_i$=Efficiency factor of machine i
$AT_i$=Total available time (in hours) of machine i during the time interval The efficiency factor β (a value between 0 to 1 inclusive) represents the performance of the machine due to the condition of the machine. The factor α represents the ratio of the allocated available capacity to the total available capacity for a machine during the time interval. For example, if a machine is fully available during the time interval, α will be 0; if the machine has been partially allocated, α will be between 0 and 1; and if a machine has been fully allocated, α will be 1. The factor α is recomputed for each machine after every execution of operation S916 (FIG. 9), in order to account for any machine allocations performed during operation S914 of FIG. 9 for previously released jobs.

Assuming a total of N work centres, the bottleneck capacity constraint may be computed by equation [3]:

$$BnQty=\min(Qty_k), k \in [1,2, \ldots, N] \qquad [3]$$

Where:
BnQty=Bottleneck capacity constraint for "entire assembly line" of current job
$Qty_k$=Number of items work center k is capable of processing Thus for example, when the bottleneck capacity constraint is active, assuming that both centers 110 and 120 are needed to process an item, if work center 110 is capable of producing 10,000 units of the item (i.e. if Qty=10,000 for work center 110) and work center 120 is capable of producing 5,000 units of that item (i.e. if Qty=5,000 for work center 120), the bottleneck number will be 5,000; machines will be allocated to process only the bottleneck number of units of item at each work center 110 and 120, even in some work centers (e.g. work center 110) may be capable of processing more than the bottleneck number of units of the item during the time interval.

(3) Machine Preference Constraint

The machine preference constraint limits the number of items of a job that can be released during a time interval based on user-specified machine preference information indicating, for each machine in the production facility 100, the preference (or suitability) of that machine for processing each job in the pool of pending jobs 206. When the machine preference constraint is operative, the job release scheduling performed in S914 (FIG. 9) for the currently selected job is performed in decreasing order of machine preference. This is illustrated in FIG. 12.

Figure 12:
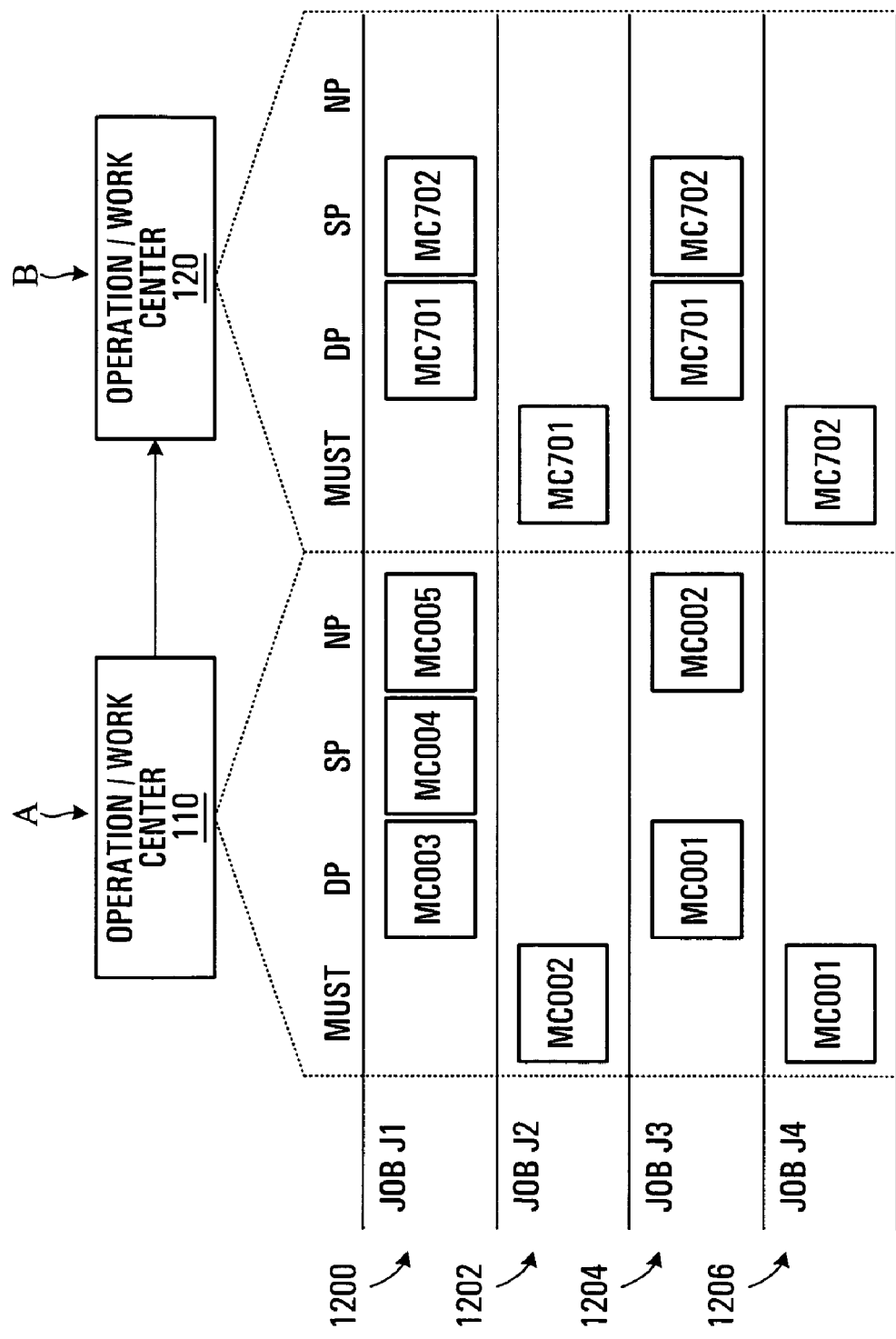
FIG. 12 illustrates job release scheduling performed with a machine preference job release constraint having been activated.

FIG. 12 illustrates a number of machine allocation chains (rows) 1200, 1202, 1204 and 1206 which are indicative of the preferred machines for four exemplary jobs J1, J2, J3 and J4 respectively. The chains are divided into two portions which are labelled as columns A and B. Column A represents preferred machines associated with work center 110 while column B represents preferred machines associated with work center 120. Examining an exemplary machine allocation chain 1200, it may be seen that, when machines at work center 110 are allocated to job J1 in S914 (FIG. 9), any available capacity on machine MC003 is allocated first, followed by any available capacity on machines MC004 and MC005, in that order. Similarly, when allocation of machines at work center 120 is being performed for job J1, any available capacity on machine MC701 is allocated first, followed by any available capacity on machines MC702.

The maximum number of items of a job that can be released for a particular work center when the machine preference constraint is operative is the Qty value computed using equation [2] above.

It will be appreciated that, of the seven job release constraints of the present embodiment, only the machine preference constraint will result in allocation of specific machines to specific jobs. For the other constraints, while the job percentage/quantity released may be determined by the availability of specific machines, no assignment of jobs to specific machines is performed or assumed.

(4) Fixture/Tooling Capacity Constraint

In order to process certain types of items, some machines require fixtures or tooling (for convenience, the term "fixture" will be assumed to include the term "tooling" hereinafter). The relationship between a machine and a fixture is one-to-one (i.e. a single fixture attaches to a single machine), although multiple machines may be capable of using the same fixture and multiple fixtures may be capable of being used by the same machine. In a given work center, a pool of available fixtures may be maintained for processing various types of items. Each fixture may potentially be attached to different machines, as necessary, given the items which require processing during the current time interval. The fixture capacity constraint indicates that, for each job, the maximum quantity of items to be released during a time interval at a work center is the maximum quantity of items capable of being processed during that time interval based on the available number of fixtures and the existence of machines having available machine capacity that are capable of using the fixtures to process the job.

It will be appreciated that the fixture capacity constraint cannot be activated unless the machine preference constraint (described above) is also activated. This is due to the fact that the utility of each fixture for processing jobs is dependent upon which specific machines are available to process jobs (since each fixture may only be compatible with certain machines). As previously indicated, of the seven job release constraints of the present embodiment, only the machine preference constraint, when activated, will result in allocation of specific machines to specific jobs.

Figures 13, 14:
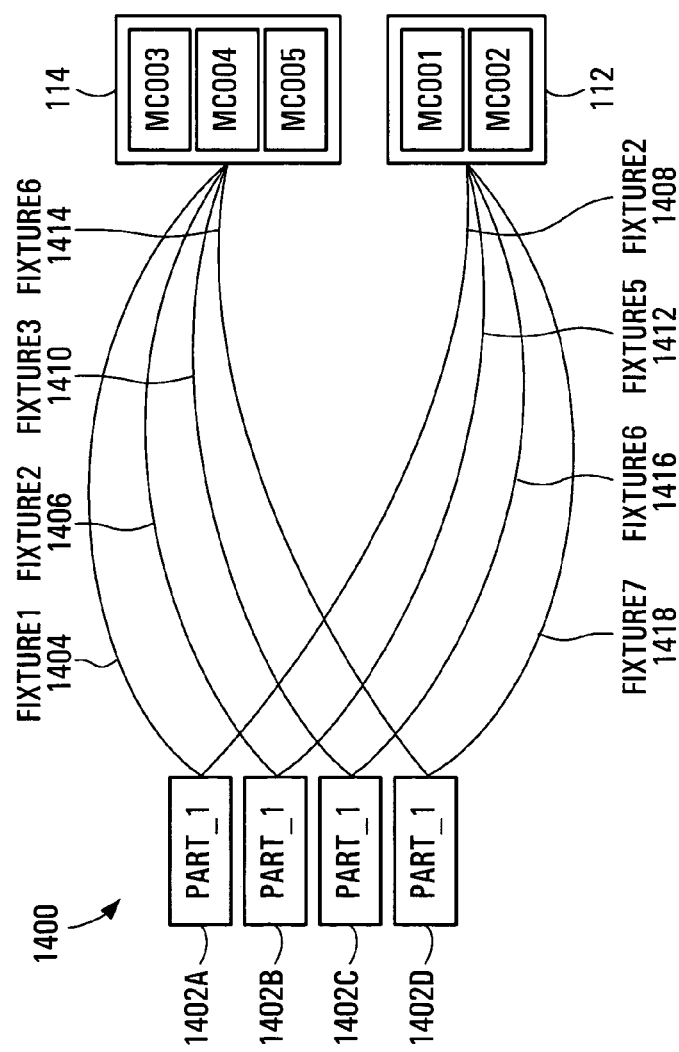
FIG. 13 illustrates an exemplary fixture capacity definition which may be used to specify one or more fixture job release capacity constraints.
FIG. 14 illustrates an exemplary fixture usage matrix which may be employed when a fixture job release capacity constraint is activated.

The fixture capacity constraint may be expressed in the context of a fixture capacity definition, which specifies one or more fixture capacity constraints. An exemplary fixture capacity definition is shown in FIG. 13 in the form of a table 1300. Table 1300 has two rows I, II and seven columns A–G. Each row represents a fixture capacity constraint. Columns A–E indicate the characteristics of the item which must be present in order for a fixture capacity constraint to apply to the associated job. In the present example in which items are semiconductor products, item characteristics include package lead count (column A), customer identifier (column B), pad size (column C), device (column D) and body size (column E). Each non-empty cell formed by an intersection of either of rows I or II with a column A–E indicates that, in order for the fixture capacity constraint represented by the containing row to apply to a job, the physical characteristic represented by the containing column for the item associated with that job) must match the value specified in the cell. Each empty cell indicates that, for purposes of determining whether the fixture capacity constraint represented by the containing row shall apply to a job, the value of the physical characteristic represented by the containing column for that job is immaterial.

Also indicated in table 1300 for each fixture capacity constraint I and II is the number of fixtures in a pool of fixture available for jobs matching the characteristics specified in columns A–E (see column F) and the processing rate that can be achieved when the fixture is used (see column G). It is noted that the processing rate of column G indicates the processing rate of the machine(s) qualified to use the fixture, as the fixture itself does not have an inherent processing rate.

FIG. 14 illustrates a fixture usage matrix 1400 that may be specified by a user to indicate, for a specific item "part_1", which fixtures may be used to process the item and which machines those fixtures may be attached to. It will be appreciated that fixture usage matrices similar to matrix 1400 may be maintained for each item to be processed. In FIG. 14, each line 1404, 1406, 1408, 1410, 1412, 1414, 1416 and 1418 between a representation 1402A, 1402B, 1402C or 1402D of the item "part_1" and a representation of a machine group 112 or 114 (see FIG. 1) indicates that, in order to process the item "part_1", the fixture identified textually on the line may be used by any machine within the machine group. Thus, the matrix 1400 indicates that, for any machine MC001 and MC002 of machine group 112, any of fixture2, fixture5, fixture6 and fixture7 may be used to process part_1, and for any machine MC003, MC004 and MC005 of machine group 114, any of fixture1, fixture2, fixture3 and fixture6 may be used to process part_1. FIG. 14 illustrates a benefit of maintaining machine group information, namely, a reduction in the amount of data that must be maintained by the job release system 200 (since redundant information is consolidated for all machines within a machine group).

(5) WIP Balancing Constraint

The objective of the WIP balancing constraint is to maintain WIP accumulations at or below user-specified optimal levels across all operations of particular jobs (i.e. for "assembly lines" as a whole) and for specified work centers. Avoidance of excessive WIP accumulations is desirable because excessive WIP may increase item processing time or "cycle time" variability and may jeopardize quality control. Undesirable WIP pileups at individual work centers may result from machine down times (e.g. due to scheduled preventative maintenance, holidays, etc.).

A user of the job release system 200 may specify both an optimum WIP level across all operations and an optimum WIP level for each dedicated operation, for different types of items to be processed. An optimum WIP level across operations for a particular item is a user-specified desired WIP quantity (e.g. a desired number of partially-finished units of the item) across all operations of the production facility 100. An optimum WIP level for a particular item at a "dedicated operation" (i.e. at a work center comprising machines that are only capable of processing that item) is a desired WIP quantity at that work center.

The WIP balancing constraint may be applied by computing a "Quantity to Reduce" amount (QR) which represents an amount by which the number of units of a job to be released for processing during the current time interval should be reduced in order to allow sufficient time for accumulated WIP exceeding an optimal value for the entire assembly line or for a particular dedicated operation to be cleared out (i.e. processed), as shown in equations [4] and [5]:

$$QR = \max(0, LWIP - OWIP, WIP_i - CO_i), i \epsilon [1, 2, \ldots, N] \quad [4]$$

$$RLQ = Qty - QR \quad [5]$$

Where:
QR=quantity to reduce
LWIP=latest WIP between first operation 1 and last operation N
OWIP=user-specified optimal WIP between first operation 1 and last operation N
$WIP_i$=latest WIP at operation i
$CO_i$=available capacity at operation i (expressed as number of units capable of being processed during a time interval)
N=number of dedicated operations
RLQ=actual quantity to be released
Qty=number of items the work center is capable of processing In equation [4], the "LWIP−OWIP" term represents a degree to which WIP for all operations of the current job exceeds optimal WIP across all operations, whereas the "$WIP_i - CO_i$" term represents a degree to which WIP for any dedicated operation exceeds the capacity of the work center to process the relevant items during the current time interval. In equation [5], the Qty amount is reduced by the larger of these two terms (or, if both terms are negative, the Qty amount remains the same). The Qty value in equation [5] may be computed using equation [2] above. For clarity, a "dedicated operation" is an operation performed at a work center having machines which are only capable of processing the item of interest.

(6) Committed Forecast Constraint

The committed forecast constraint specifies a maximum number of units to be processed per time interval for jobs which are included in an MPS 208 (i.e. a "committed customer forecast" 208). When time intervals equate to days, the maximum number of units may be referred to as a "Daily Run Rate" or a "Daily Expected Output". The target is thus an apportionment of an overall desired number of items (as expressed in MPS 208) over multiple time intervals.

To illustrate how this constraint interacts with other operative constraints, if the committed forecast constraint specifies a target number of 10,000 units per time interval for a particular job, yet the number of items of that job is limited by another constraint (e.g. the baseline capacity constraint) to 7,000 units per time interval, job release of the lesser number of units is scheduled.

(7) Loading Pattern Constraint

The objective of the loading pattern constraint is to promote the highest possible degree of similarity between the characteristics of jobs released during the current time interval and the characteristics of jobs released during the immediately preceding time interval. Typically, the job characteristics for which similarity is sought between adjacent time intervals are physical characteristics of items to be processed. The rationale for the loading pattern constraint is to limit machine setup or conversion time which may result when machines which were configured for processing one item during the preceding time interval are reconfigured or set up to be capable of processing another item during the current time interval.

Different degrees of required similarity between jobs in adjacent time intervals may be specified. Jobs whose characteristics are sufficiently similar to the characteristics of one or more jobs released for processing during the immediately preceding time interval so as to achieve a high degree of similarity are selected (S912 of FIG. 9) and scheduled for job release (S914 of FIG. 9) first. Then, job release scheduling is performed for jobs whose characteristics have progressively smaller degrees of similarity to the characteristics of one or more jobs released for processing during the immediately preceding time interval. The rationale for this approach is that higher degrees of similarity are preferable as they generally correspond to lower machine setup times. Nevertheless, some degree of similarity is better than none.

The specification of various levels of required similarity between characteristics of jobs in adjacent time intervals is illustrated in table 1500 of FIG. 15. Each of the four rows of table 1500 specifies a different level or degree of similarity, with level 1 representing the highest degree of similarity and level 4 representing the lowest degree of similarity (levels are identified in column A). Columns B–F represent physical characteristics of items associated with jobs. In the present example, the items are semiconductor products, thus the characteristics are semiconductor product characteristics. Each cell containing a "V" represents a requirement that the physical characteristic represented by the containing column must match between jobs in adjacent time intervals in order for the degree of similarity represented by the containing row to be present. Each empty cell indicates that the physical characteristic represented by containing column need not match between jobs in adjacent time intervals in order for the degree of similarity represented by the containing row to be present.

When a desired degree of similarity (e.g. any of levels 1–4 of FIG. 15) is sought between jobs in adjacent time intervals, the jobs in the preceding time interval are grouped into unique combinations or "patterns" of the relevant item characteristics for that level. Thereafter, the characteristics of each job remaining in the pool of pending jobs compared to the pattern to determine whether or not the relevant degree of similarity is present.

FIGS. 16A, 16B, 16C and 16D illustrate in tables 1600, 1602, 1604 and 1606 respectively the definition of characteristic "patterns" when relevant product characteristics associated with the four degrees of similarity (levels 1–4) of table 1500 are applied to an exemplary group of jobs released for processing during an immediately preceding time interval.

Referring first to FIG. 16A, the highest degree of similarity (i.e. level 1) is sought first between jobs in adjacent time intervals. The jobs in the preceding time interval are grouped into unique patterns of the requisite item characteristics, which for level 1 are customer ID, package lead count, pad size, body size, and device (columns B–F respectively of table 1500 in FIG. 15). For the jobs assumed to be released for processing during the immediately preceding time interval for the present example, the result is seven unique patterns I–VII, each represented by a row of table 1600. The unique values for customer ID, package lead count, pad size, body size, and device are set forth in columns A–E respectively of table 1600 (column F indicates the quantity of items matching the unique to be processed during said immediately preceding time interval). Thus, when selecting a job for job release scheduling (i.e. when performing operation S912 of FIG. 9), the characteristics of the item associated with each of the jobs in the pool of pending jobs 206 are compared to each of the unique patterns in the rows I–VII. If the characteristics of any jobs in the pending pool of jobs 206 match any of the patterns I–VII, the highest degree of similarity is present, and such jobs are scheduled for release first.

Assuming available machine capacity remains after job release scheduling has been performed the jobs having the highest degree of similarity, subsequently an attempt is made to schedule job release for jobs having the next (lesser) degree of similarity to jobs released for processing during the immediately preceding time interval. The jobs in the preceding time interval are now grouped into unique patterns of the relevant product characteristics for level 2, which include customer ID, package lead count, and pad size (columns B–D respectively of table 1500 of FIG. 15). The result is a set of five unique patterns I–V as illustrated in the rows of table 1602 (FIG. 16B). Now, when selecting a job for job release scheduling, the characteristics of the item (product) associated with each pending job are compared to each of the unique patterns in the rows I–V, and if they match any of the patterns, the second highest degree of similarity is present. Such jobs are scheduled for release next.

This approach is repeated for the remaining two levels 3 and 4 (FIG. 15), resulting in three unique patterns I–III for level 3 (see table 1604 of FIG. 16C) and two unique patterns I and II for level 4 (see table 1606 of FIG. 16D).

Figure 17:
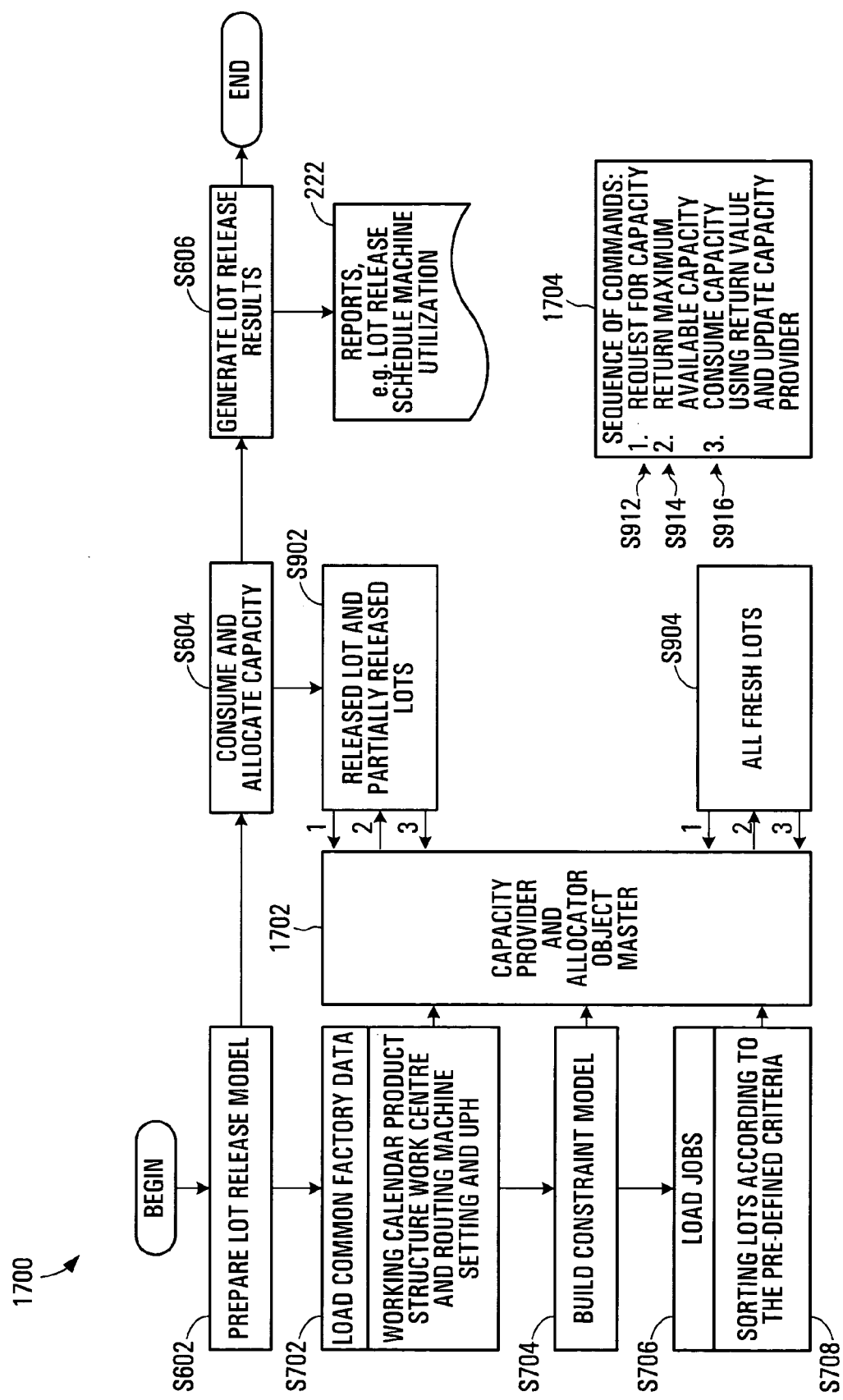
FIG. 17 illustrates an alternative representation of the operation illustrated in FIGS. 6, 7 and 9.

FIG. 17 illustrates an alternative representation 1700 of the operation illustrated in FIGS. 6, 7 and 9. In FIG. 17, the reference numerals applied to the illustrated operations match those used in FIGS. 6–8. The illustrated "capacity provider and allocator object master" 1702 represents the portion of job release system 200 responsible for allocating available machine capacity based on multiple operative job release constraints. A key 1704 provides a legend to the arrows numbered "1", "2" and "3" between the capacity provider and allocator object master 1702 and each of operation S802 and S804, which arrows correspond to operations S912, S914 and S916 respectively of FIG. 9.

As will be appreciated by those skilled in the art, modifications to the above-described embodiment can be made without departing from the essence of the invention. For example, in the event that any jobs in the pool of pending jobs 206 have fixed loading dates/times (i.e. fixed dates/times at which they are to be released), job release scheduling for such jobs may be performed after scheduling of partially released jobs is completed (S902 of FIG. 9) and before the scheduling of new jobs is initiated (S904). For each such job, job releasing scheduling may be performed in accordance with operation S910 to S916 of FIG. 9, in a similar manner as it is performed for new jobs or partially released jobs.

As well, it should be appreciated that alternative embodiments may permit only one of the job release constraints 202 to be activated at a time (with the caveat that the fixture/tooling capacity constraint can only be activated when the machine preference constraint is activated). Moreover, the job release constraints 202 activated during a first job release scheduling run may differ from the job release constraints 202 activated during a second, subsequent job release scheduling run.

Additionally, it will be appreciated that the jobs in the pool 206 could include a further group of jobs besides the first and second groups described above (i.e. besides jobs for which partial release has been scheduled during the preceding time interval and new jobs). The third group of jobs comprises jobs that have been planned for release during the a time interval interest but which have yet to be physically released. For example, a planner could be planning the job release for day n, but a few scheduling runs may be required before job release scheduling is finalized. In each scheduling run, some jobs may be released by the job release system. The planner could instruct the system to save the intermediate result for later retrieval by the system for further job release planning for day n.

It will further be appreciated that the job release system 200 may be used to generate committed or forecast Finished Goods (FG) dates and shipment dates for pending jobs. That is, a similar mechanism as described above may be applied, but the result may not be an indication of when jobs are to be released, but rather an indication of when jobs are committed or forecast to be completed and when they are committed or forecast to be shipped.

When the time interval during which a job is fully released or partially released with no remaining portion left to be released has been determined (referred to as "processing start date" or "production start date"), the committed FG date and committed shipment dates may be determined by equations [6] and [7], as follows:

$$CFGD = SD + PLT \quad [6]$$

$$CSD = CFGD + SLT \quad [7]$$

Where:
CFGD=committed FG date
SD=processing start date
PLT=processing lead time
CSD=committed shipment date
SLT=shipment lead time It is noted that, for partially released lots released during multiple time intervals, the last time interval is used as the processing start date.

When processing start dates are not known (as will be the case for jobs which have not yet been released), forecast FG dates and shipment dates may be determined by the system 200 based on an assessment of machine loading and forecast processing start dates. For forecast FG and shipment date determination, available machine capacity allocation is performed in a manner which deviates somewhat from the allocation procedure of the above-described embodiment. Specifically, a percentage "Y" of the available machine capacity is reserved for jobs whose forecast processing start dates match the current date. For example, when new, high priority jobs are received, the forecast processing start date for such jobs may be set to the current date, since they are sufficiently important to be forecast for release immediately; the "Y" percentage of available machine capacity may be allocated to such jobs. The remaining percentage "X" (where X=100−Y) may be used to schedule jobs regardless of forecast production start date.

The manner in which the allocation process is performed during forecast FG and shipment date determination is illustrated in FIGS. 18A to 18E. These figures illustrate the forecast processing start dates and forecast FG dates for thirty exemplary jobs (lots) in inventory which result from the allocation of these jobs to machines over the course of three time intervals. In the example, each time interval is one day.

Referring first to FIG. 18A, table 1800 illustrates forecast processing start dates and forecast FG dates for the thirty exemplary jobs after allocation to machines as calculated on day 1 (i.e. time interval "Day1"). The jobs are identified by lot number in a first column A, and the forecast processing start date and forecast FG dates are provided in columns B and C respectively. It is assumed that the jobs are ranked using user-selected job ranking criteria (as described above for new jobs), with job "Lot1" being the most highly ranked job and job "Lot30" being the least highly ranked job. It is further assumed that the processing cycle time is four days.

As shown in FIG. 18A, the first ten jobs are designated for processing during the first time interval "Day1" (1802); the next ten jobs are designated for processing during the second time interval "Day2" (1804); and the last ten jobs are designated for processing during the third time interval "Day3" (1806). Up to this point, none of the three days' "Y" capacity is used, as "Y" is reserved for newly arrived lots, which are typically urgent lots. That is, during the generation of the forecast FG and shipment dates, the system detects the presence of any job which has been previously generated with a forecast processing start date on a particular day. If no record can be found for that particular day, as in the current scenario, the "Y" percentage of the available capacity for Day 1 to Day 3 will be automatically reserved for newly arrived jobs during capacity allocation, leaving only the "X" percentage of capacity for the thirty jobs. As may be seen in column C, the forecast FG date for each job is four days after its forecast processing start date.

Turning to FIG. 18B, table 1810 illustrates forecast processing start dates and forecast FG dates for the exemplary jobs after allocation to machines as calculated for time interval "Day2". The first ten jobs are not shown in FIG. 18B, as it is assumed that they were released to the shop floor during time interval "Day 1". On day 2, new lots arrive, including lots A, B, C, D and E. The as-yet unreleased jobs (lots 11 to 30) and the newly arrived lots (lots A to E) are re-ranked according to the same job ranking criteria originally used to sort lots 1 to 30, with result being a ranking of A to E and 11 to 30, in decreasing order of rank. Allocation is performed for these twenty-five lots, with the result being indicated in FIG. 18B. Before any of the "Y" percentage for time interval "Day2" can be allocated, the "X" percentage for time interval "Day2" should be fully allocated. Assuming new jobs A to E and lots 11 to 14 fully consume Day2's "X" percentage (as shown at 1812), the "Y" percentage can now be allocated to any other jobs having a forecast processing start date of Day2, e.g., lots 15 to 20.

If the "Y" percentage can accommodate lots 15 to 20 (as shown at 1814—FIG. 18B), each of lots A to E and 11 to 20 will have a forecast processing start date of Day2, and thus a forecast FG date of Day6, as illustrated in FIG. 18B.

Referring now to table 1820 of FIG. 18C, if, on the other hand, the "Y" percentage cannot accommodate lots 15 to 20, but rather can only accommodate lots 15 to 18 (as shown at 1824), then only lots A to E and 11 to 18 will have a forecast processing start date of Day2 and a forecast FG date of Day6. Lots 19 and 20 will be pushed to Day3 for allocation.

For time interval Day3, allocation is performed for lots 19 to 30. Again, the "X" percentage is to be fully utilized before any "Y" percentage is allocated. Referring FIG. 18D, assuming lots 19 to 26 fully consume the "X" capacity for Day3 (see portion 1832 of table 1830), "Y" percentage can now be allocated to any other jobs having a forecast processing start date of Day3, i.e., to lots 27 to 30.

If the "Y" percentage can accommodate lots 27 to 30 (as shown at 1834 of FIG. 18D), each of lots 19 to 30 will have a forecast processing start date of Day3 and thus a forecast FG date of Day7, as illustrated in FIG. 18D.

If, on the other hand, the "Y" percentage cannot accommodate lots 27 to 30, but rather can only accommodate lots 27 and 28 (1844—FIG. 18E), then only lots 19 to 28 will have a forecast processing start date of Day3 and a forecast FG date of Day7. Lots 29 and 30 will be pushed to Day4 for allocation (1846).

This process is repeated for subsequent time intervals.

It will also be appreciated that the job release system 200 may be used to assess how much machine capacity is available for order promising (Available-to-promise or ATP). ATP indicates how many units of a particular item or items can be processed during a time interval of interest given available capacity not committed to customer orders.

Figures 19, 20:
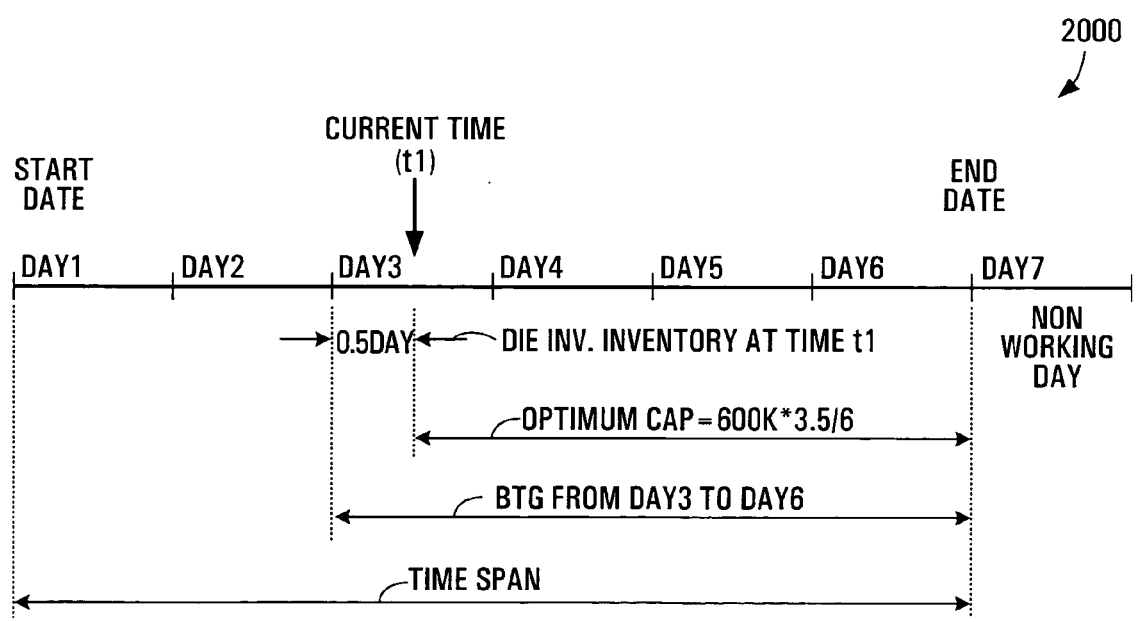
FIG. 19 illustrates available-to-promise quantities for an item of interest as determined by an alternative embodiment of the of the job release system.
FIG. 20 illustrates a time line indicating some of the available-to-promise quantities set forth in FIG. 19.

FIG. 19 illustrates a table 1900 representing an exemplary ATP calculation for each day during a one-week time span for a part "AMD_14ssop". FIG. 19 is perhaps best viewed in conjunction with FIG. 20, which illustrates a time line 2000 for the one-week span indicating some of the available-to-promise quantities set forth in FIG. 19. The rows of table 1900 (FIG. 19) below the first row represent ATP calculations for particular days identified in parentheses within the identifier in column A (e.g. "(D1)" refers to day 1). The remaining columns (B to E) of table 1900 contain various quantities involved in the generation of ATP according to the following equations:

$$BTG = BC - TRQ \qquad [8]$$

$$OC = MC * LD/TD \qquad [9]$$

$$SOB = OC - BTG \qquad [10]$$

$$SOD = OC - DI \qquad [11]$$

Where:
DI=die inventory
BC=booked capacity for time span
TRQ=total quantity released before current day
BTG=balance to go
OC=optimum capacity of time span
MC=maximum capacity of time span
LD=working days left in time span
TD=total working days in time span
SOB=spot order per BTG
SOD=spot order per DI "Die Inventory" is an item-specific value referring to the actual quantity of dies (i.e. semiconductor dies) received and kept in inventory (e.g., see column A of FIG. 19). In a non-semiconductor industry example, this value may be referred to as "raw material units inventory". This number reflects the number of items which could be manufactured based on raw materials on hand assuming infinite machine capacity. "Booked Capacity" is an item-specific value referring to the committed forecast (i.e. MPS) quantity for the relevant item for the time span in question (column C of FIG. 19). "Total Released Quantity" refers to the number of units released during the time span up to the beginning of the current day. "Balance To Go" refers to the number of units to be released on the current day and on the remaining days of the time span (column D). "Optimum Capacity" (OC) refers to the item-specific quantity of units that could be processed during the remaining time span given the job release constraints and machine preference settings for the relevant item (column E) which are assumed to be operational. "Maximum Capacity" refers to the maximum number of units of the relevant item that could be processed during the time span given the operative job release constraints and machine preference settings for the relevant item. "Spot Order per BTG" refers to the size (number of units) of spot order for the relevant item that could be accommodated based on the BTG (column F). Finally, "Spot Order per Die Inventory" (SOD) refers to the size of spot order for the relevant item that could be accommodated based on the Die Inventory (column G). SOD is a measure of the quantity of units of the relevant item that can be processed from the OC based on available raw materials (dies) in inventory. This is a measure of the number of jobs could be readily release for production since they are already in the die inventory.

It will be appreciated that, while Optimum Capacity is an item-specific quantity, OC could be shared by different items/products from different customers for non-dedicated (i.e. shared) work centers. For example, assume that three items from different customers (Part A, Part B, and Part C) share ten machines in work center 123 based on machine preferences specified for those items. During the computation of OC for each individual item, all the ten machine capacities are assumed to be all available for any of part A, Part B, or Part C, simultaneously. Assume availability of machine capacity for an ad hoc order for, say, part A, is being examined. If the ad hoc order consumes an equivalent of ten machines' capacity, then the OC for all three parts will be reduced to zero. Thus, although OC is considered to be an item-specific quantity, for shared operation resources, once the shared capacity is consumed by other parts, all relevant OCs will be updated accordingly.

When the values shown in table 1900 FIG. 19 are computed for a particular item during a particular time span, the system can evaluate whether ad hoc quantities may be accommodated. Each time an ad hoc quantity is input for the item, the "Spot Order per BTG" and "Spot Order per Die Inventory" values may be reduced accordingly. For example, FIGS. 21 and 22 illustrate table 2100 and 2200 respectively in which the quantities described above in conjunction with columns B–G of FIG. 19 are illustrated (also in columns B to G) for the part AMD_14ssop (as identified in column A). In FIG. 21, column H has a blank (zero) specified ad hoc quantity. When the ad hoc quantity is changed to 100,000 in FIG. 22, the change to the SOB and SOD values in columns F and G is apparent.

Other modifications will be apparent to those skilled in the art and, therefore, the invention is defined in the claims.

What is claimed is:

1. A method of scheduling the release of jobs from a pool of pending jobs, the method comprising:

selecting a job;
determining available machine capacity for said job based on job characteristics of said job and machine information including machine availability information about one or more machines capable of processing said job;
allocating at least some of said available machine capacity to said job subject to multiple job release constraints; and
updating said machine availability information to reflect said allocating.

2. The method of claim 1 further comprising:
repeating said selecting, said determining, said allocating and said updating until either said available capacity is exhausted or until said allocating has been performed for each of said pending jobs of said pool.

3. The method of claim 2 wherein said job characteristics include a specified number of items to be processed and wherein said machine information further includes an indication of a processing rate for each of one or more machines for processing said items.

4. The method of claim 3 wherein said job characteristics include characteristics of an item associated with said job.

5. The method of claim 3 wherein said available capacity is expressed as a number of units of said item capable of being processed during a time interval.

6. The method of claim 2 wherein said determining and said allocating is performed for a current time interval and wherein said selecting comprises, if said pending jobs include at least one job which has been partially released during a preceding time interval, selecting said at least one job before selecting a job which has not been fully or partially released as of the current time interval.

7. The method of claim 2 wherein said determining and said allocating is performed for a current time interval and wherein said selecting comprises, if said pending jobs include at least one job which has either been partially released during a preceding time interval or designated for full release during one or more preceding time intervals without yet being physically released, selecting said at least one job before selecting a job which has not been either partially released during a preceding time interval or designated for full release during one or more preceding time intervals without yet being physically released.

8. The method of claim 2 wherein said determining and said allocating is performed for a current time interval and further comprising ranking any pending jobs which have not been fully or partially released as of the current time interval, and wherein said selecting is performed in decreasing order of said ranking.

9. The method of claim 8 wherein said ranking is based on selected job ranking criteria.

10. The method of claim 9 wherein said job ranking criteria comprise primary job ranking criteria for grouping said jobs into categories and secondary job ranking criteria for ranking jobs within said categories.

11. The method of claim 9 wherein said job ranking criteria are selected from the group consisting of whether a committed customer forecast for processing a job has been specified, whether a job is expected to meet a desired shipment date or time, whether a job is expected to meet a desired loading date or time, a job priority, whether a master production schedule includes a job, a customer priority associated with a job, and either or both of a date and time on which a job is received.

12. The method of claim 3 wherein said job release constraints include a baseline capacity constraint specifying a maximum quantity of items to be released during a time interval for jobs whose characteristics match a specified set of member characteristics.

13. The method of claim 12 wherein said baseline capacity constraint specifies two or more sets of member characteristics, each of said sets of characteristics having an associated maximum quantity of items to be released during said time interval for jobs whose characteristics match said member characteristics.

14. The method of claim 13 wherein if the maximum quantity of items associated with a first one of said two or more sets of member characteristics differs from the maximum quantity of items associated with a second one of said two or more sets of member characteristics, the maximum quantity of items of a job which characteristics match both of said first and said second sets of member characteristics to be released during said time interval is deemed to be the lesser maximum quantity.

15. The method of claim 12 wherein said member characteristics are physical characteristics of the items to be processed.

16. The method of claim 1 wherein said machine information further includes a suitability of said one or more machines for processing said job and wherein said job release constraints include a machine preference constraint specifying that said allocating is further subject to said suitability.

17. The method of claim 16 wherein said job characteristics include a specified number of items to be processed and wherein said suitability of said machine comprises a preference of said one or more machines for processing said items.

18. The method of claim 16 wherein said suitability comprises a preference level selected from a range of preference levels.

19. The method of claim 18 wherein said allocating is performed for a machine having a high preference level for processing said job before it is performed for a machine having a low preference level for processing said job.

20. The method of claim 17 wherein each of said one or more machines requires a fixture to be capable of processing a job, wherein said machine information includes information about an available number of fixtures, wherein said job release constraints include a fixture capacity constraint indicating that the maximum quantity of items to be released during a time interval at a work center for said job is a maximum quantity of items capable of being processed during said time interval based on said available number of fixtures and the existence of machines having said available machine capacity that are capable of using said fixtures to process said job.

21. The method of claim 3 wherein said one or more machines comprise multiple machines grouped into a plurality of work centers, each of said work centers for performing a job processing operation, and wherein said job release constraints include a bottleneck capacity constraint indicating that, for said job, the maximum quantity of items to be released during a time interval at each work center is a smallest one of a maximum quantity of items capable of being processed during said time interval at any work center for performing a processing operation of said job.

22. The method of claim 2 wherein said job release constraints include a work-in-process (WIP) balancing constraint specifying an optimal WIP quantity for said job, and wherein said allocating is performed such that said optimal WIP quantity is not exceeded for said job.

23. The method of claim 2 wherein said optimal WIP quantity is cumulative for all job processing operations associated with said job.

24. The method of claim 2 wherein said one or more machines comprise multiple machines grouped into a plurality of work centers, each of said work centers for performing a job processing operation, and wherein said optimal WIP quantity is associated with one of said work centers.

25. The method of claim 3 wherein said job release constraints include a job-specific committed forecast constraint specifying a maximum number of items of said job to be processed during a time interval, said maximum number of items being based on an apportionment of the processing of a desired number of items over multiple time intervals.

26. The method of claim 2 wherein said method is for scheduling the release of jobs during a current time interval and wherein said job release constraints include a loading pattern constraint specifying a required degree of similarity between the characteristics of one or more jobs released for processing during an immediately preceding time interval and the characteristics of a job to be released during said current time interval.

27. The method of claim 26 wherein said loading pattern constraint specifies first and second required degrees of similarity between the characteristics of one or more jobs released for processing during an immediately preceding time interval and the characteristics of a job to be released during said current time interval, said first required degree of similarity being higher than said second required degree of similarity, and wherein said allocating comprises allocating said available machine capacity to a pending job having said first degree of similarity to one or more jobs released for processing during an immediately preceding time interval before allocating any of said available machine capacity to a pending job having said second degree of similarity to one or more jobs released for processing during an immediately preceding time interval.

28. The method of claim 26 wherein said characteristics of a job are physical characteristics of an item to be processed.

29. The method of claim 1 further comprising:
identifying a raw material necessary for processing said job; and
assessing an amount of said raw material in inventory, and wherein said allocating is performed only to the extent that said amount of raw material in inventory is sufficient to process said job.

30. The method of claim 6 further comprising:
determining a time interval during which said job is to be fully released or partially released with no remaining portion left to be released, said time interval being referred to as a processing start time interval; and
adding an expected processing duration for processing said job to said processing start time interval determine a committed finished goods time.

31. The method of claim 30 further comprising:
adding a shipment lead time to said committed finished goods time to determine a committed shipment time.

32. The method of claim 6 further comprising forecasting a time interval during which said job is to be fully released or partially released with no remaining portion left to be released, said time interval being referred to as a forecast processing start time interval, and wherein said determining available machine capacity for said job comprises reserving a portion of said available machine capacity, said reserving resulting in reserved machine capacity, and wherein said allocating allocates said reserved machine capacity to said job only if said forecast processing start date matches a current date.

33. The method of claim 3 wherein said job release constraints include two or more of:
a baseline capacity constraint specifying a maximum quantity of items to be released during a time interval for jobs whose characteristics match a specified set of member characteristics;
a machine preference constraint specifying that said allocating is further subject to a suitability of said one or more machines for processing said job;
a bottleneck capacity constraint indicating that, for said job, the maximum quantity of items to be released during a time interval at each of a plurality of work centers including one or more machines is a smallest one of a maximum quantity of items capable of being processed during said time interval at any work center for performing a processing operation of said job;
a work-in-process (WIP) balancing constraint specifying an optimal WIP quantity for said job, wherein said allocating is performed such that said optimal WIP quantity is not exceeded for said job;
a job-specific committed forecast constraint specifying a maximum number of items of said job to be processed during a time interval, said maximum number of items being based on an apportionment of the processing of a desired number of items over multiple time intervals; and
a loading pattern constraint specifying a required degree of similarity between the characteristics of one or more jobs released for processing during an immediately preceding time interval and the characteristics of a job to be released during a current time interval.

34. A machine-readable medium including code for scheduling the release of jobs from a pool of pending jobs, comprising:
machine-executable code for selecting a job;
machine-executable code for determining available machine capacity for said job based on job characteristics of said job and machine information including machine availability information about one or more machines capable of processing said job;
machine-executable code for allocating at least some of said available machine capacity to said job subject to multiple job release constraints; and
machine-executable code for updating said machine availability information to reflect said allocating.

35. The machine-readable medium of claim 34 further comprising:
machine-executable code for repeating said selecting, said determining, said allocating and said updating until either said available capacity is exhausted or until said allocating has been performed for each of said pending jobs of said pool.

36. The machine-readable medium of claim 35 wherein said job characteristics include a specified number of items to be processed and wherein said machine information further includes an indication of a processing rate for each of one or more machines for processing said items.

37. The machine-readable medium of claim 35 wherein said job characteristics include characteristics of an item associated with said job.

38. The machine-readable medium of claim 36 wherein said available capacity is expressed as a number of units of said item capable of being processed during a time interval.

39. The machine-readable medium of claim 35 wherein said determining and said allocating are for a current time interval and wherein said selecting comprises, if said pending jobs include at least one job which has been partially released during a preceding time interval, selecting said at least one job before selecting a job which has not been fully or partially released as of the current time interval.

40. The machine-readable medium of claim 35 wherein said determining and said allocating are for a current time interval and wherein said selecting comprises, if said pending jobs include at least one job which has either been partially released during a preceding time interval or designated for full release during one or more preceding time intervals without yet being physically released, selecting said at least one job before selecting a job which has not been either partially released during a preceding time interval or designated for full release during one or more preceding time intervals without yet being physically released.

41. The machine-readable medium of claim 35 wherein said determining and said allocating are for a current time interval and further comprising machine-executable code for ranking any pending jobs which have not been fully or partially released as of the current time interval, and wherein said selecting is performed in decreasing order of said ranking.

42. The machine-readable medium of claim 41 wherein said ranking is based on selected job ranking criteria.

43. The machine-readable medium of claim 42 wherein said job ranking criteria comprise primary job ranking criteria for grouping said jobs into categories and secondary job ranking criteria for ranking jobs within said categories.

44. The machine-readable medium of claim 42 wherein said job ranking criteria are selected from the group consisting of whether a committed customer forecast for processing a job has been specified, whether a job is expected to meet a desired shipment date or time, whether a job is expected to meet a desired loading date or time, a job priority, whether a master production schedule includes a job, a customer priority associated with a job, and either or both of a date and time on which a job is received.

45. The machine-readable medium of claim 35 wherein said job release constraints include a baseline capacity constraint specifying a maximum quantity of items to be released during a time interval for jobs whose characteristics match a specified set of member characteristics.

46. The machine-readable medium of claim 45 wherein said baseline capacity constraint specifies two or more sets of member characteristics, each of said sets of characteristics having an associated maximum quantity of items to be released during said time interval for jobs whose characteristics match said member characteristics.

47. The machine-readable medium of claim 46 wherein if the maximum quantity of items associated with a first one of said two or more sets of member characteristics differs from the maximum quantity of items associated with a second one of said two or more sets of member characteristics, the maximum quantity of items of a job which characteristics match both of said first and said second sets of member characteristics to be released during said time interval is deemed to be the lesser maximum quantity.

48. The machine-readable medium of claim 45 wherein said member characteristics are physical characteristics of the items to be processed.

49. The machine-readable medium of claim 1 wherein said machine information further includes a suitability of said one or more machines for processing said job and wherein said job release constraints include a machine preference constraint specifying that said allocating is further subject to said suitability.

50. The machine-readable medium of claim 49 wherein said job characteristics include a specified number of items to be processed and wherein said suitability of said machine comprises a preference of said one or more machines for processing said items.

51. The machine-readable medium of claim 49 wherein said suitability comprises a preference level selected from a range of preference levels.

52. The machine-readable medium of claim 51 wherein said allocating is performed for a machine having a high preference level for processing said job before it is performed for a machine having a low preference level for processing said job.

53. The machine-readable medium of claim 50 wherein each of said one or more machines requires a fixture to be capable of processing a job, wherein said machine information includes information about an available number of fixtures, wherein said job release constraints include a fixture capacity constraint indicating that the maximum quantity of items to be released during a time interval at a work center for said job is a maximum quantity of items capable of being processed during said time interval based on said available number of fixtures and the existence of machines having said available machine capacity that are capable of using said fixtures to process said job.

54. The machine-readable medium of claim 35 wherein said one or more machines comprise multiple machines grouped into a plurality of work centers, each of said work centers for performing a job processing operation, and wherein said job release constraints include a bottleneck capacity constraint indicating that, for said job, the maximum quantity of items to be released during a time interval at each work center is a smallest one of a maximum quantity of items capable of being processed during said time interval at any work center for performing a processing operation of said job.

55. The machine-readable medium of claim 35 wherein said job release constraints include a work-in-process (WIP) balancing constraint specifying an optimal WIP quantity for said job, and wherein said allocating is performed such that said optimal WIP quantity is not exceeded for said job.

56. The machine-readable medium of claim 35 wherein said optimal WIP quantity is cumulative for all job processing operations associated with said job.

57. The machine-readable medium of claim 35 wherein said one or more machines comprise multiple machines grouped into a plurality of work centers, each of said work centers for performing a job processing operation, and wherein said optimal WIP quantity is associated with one of said work centers.

58. The machine-readable medium of claim 36 wherein said job release constraints include a job-specific committed forecast constraint specifying a maximum number of items of said job to be processed during a time interval, said maximum number of items being based on an apportionment of the processing of a desired number of items over multiple time intervals.

59. The machine-readable medium of claim 35 wherein said code for scheduling the release of jobs is code for scheduling the release of jobs during a current time interval and wherein said job release constraints include a loading pattern constraint specifying a required degree of similarity between the characteristics of one or more jobs released for processing during an immediately preceding time interval and the characteristics of a job to be released during said current time interval.

60. The machine-readable medium of claim 59 wherein said loading pattern constraint specifies first and second required degrees of similarity between the characteristics of one or more jobs released for processing during an immediately preceding time interval and the characteristics of a job to be released during said current time interval, said first required degree of similarity being higher than said second required degree of similarity, and wherein said allocating comprises allocating said available machine capacity to a pending job having said first degree of similarity to one or more jobs released for processing during an immediately preceding time interval before allocating any of said available machine capacity to a pending job having said second degree of similarity to one or more jobs released for processing during an immediately preceding time interval.

61. The machine-readable medium of claim 59 wherein said characteristics of a job are physical characteristics of an item to be processed.

62. The machine-readable medium of claim 34 further comprising:
   machine-executable code for identifying a raw material necessary for processing said job; and
   machine-executable code for assessing an amount of said raw material in inventory,
and wherein said allocating is performed only to the extent that said amount of raw material in inventory is sufficient to process said job.

63. The machine-readable medium of claim 39 further comprising:
   machine-executable code for determining a time interval during which said job is to be fully released or partially released with no remaining portion left to be released, said time interval being referred to as a processing start time interval; and
   machine-executable code for adding an expected processing duration for processing said job to said processing start time interval determine a committed finished goods time.

64. The machine-readable medium of claim 63 further comprising:
   machine-executable code for adding a shipment lead time to said committed finished goods time to determine a committed shipment time.

65. The machine-readable medium of claim 39 further comprising machine-executable code for forecasting a time interval during which said job is to be fully released or partially released with no remaining portion left to be released, said time interval being referred to as a forecast processing start time interval, and wherein said determining available machine capacity for said job comprises reserving a portion of said available machine capacity, said reserving resulting in reserved machine capacity, and wherein said allocating allocates said reserved machine capacity to said job only if said forecast processing start date matches a current date.

66. The machine-readable medium of claim 36 wherein said job release constraints include two or more of:
   a baseline capacity constraint specifying a maximum quantity of items to be released during a time interval for jobs whose characteristics match a specified set of member characteristics;
   a machine preference constraint specifying that said allocating is further subject to a suitability of said one or more machines for processing said job;

a bottleneck capacity constraint indicating that, for said job, the maximum quantity of items to be released during a time interval at each of a plurality of work centers including one or more machines is a smallest one of a maximum quantity of items capable of being processed during said time interval at any work center for performing a processing operation of said job;

a work-in-process (WIP) balancing constraint specifying an optimal WIP quantity for said job, wherein said allocating is performed such that said optimal WIP quantity is not exceeded for said job;

a job-specific committed forecast constraint specifying a maximum number of items of said job to be processed during a time interval, said maximum number of items being based on an apportionment of the processing of a desired number of items over multiple time intervals; and a loading pattern constraint specifying a required degree of similarity between the characteristics of one or more jobs released for processing during an immediately preceding time interval and the characteristics of a job to be released during a current time interval.

67. A computing device comprising a processor and persistent storage memory in communication with said processor storing machine-readable code for directing said device to schedule the release of jobs from a pool of pending jobs, comprising:

means for selecting a job;

means for determining available machine capacity for said job based on job characteristics of said job and machine information including machine availability information about one or more machines capable of processing said job;

means for allocating at least some of said available machine capacity to said job subject to multiple job release constraints; and means for updating said machine availability information to reflect said allocating.

68. The computing device of claim 67 wherein said job release constraints include two or more of:

a baseline capacity constraint specifying a maximum quantity of items to be released during a time interval for jobs whose characteristics match a specified set of member characteristics;

a machine preference constraint specifying that said allocating is further subject to a suitability of said one or more machines for processing said job;

a bottleneck capacity constraint indicating that, for said job, the maximum quantity of items to be released during a time interval at each of a plurality of work centers including one or more machines is a smallest one of a maximum quantity of items capable of being processed during said time interval at any work center for performing a processing operation of said job;

a work-in-process (WIP) balancing constraint specifying an optimal WIP quantity for said job, wherein said allocating is performed such that said optimal WIP quantity is not exceeded for said job;

a job-specific committed forecast constraint specifying a maximum number of items of said job to be processed during a time interval, said maximum number of items being based on an apportionment of the processing of a desired number of items over multiple time intervals; and a loading pattern constraint specifying a required degree of similarity between the characteristics of one or more jobs released for processing during an immediately preceding time interval and the characteristics of a job to be released during a current time interval.

* * * * *